United States Patent
Rackleff et al.

(10) Patent No.: US 10,053,128 B2
(45) Date of Patent: Aug. 21, 2018

(54) TRAILER HITCH ATTACHABLE CARTS AND METHODS OF MAKING AND USING THE SAME

(71) Applicants: Richard Kevin Rackleff, Statesboro, GA (US); Roy Elmer Blackburn, Metter, GA (US)

(72) Inventors: Richard Kevin Rackleff, Statesboro, GA (US); Roy Elmer Blackburn, Metter, GA (US)

(73) Assignee: BIG KAT BUGGY, LLC, Statesboro, GA (US)

( * ) Notice: Subject to any disclaimer, the term of this patent is extended or adjusted under 35 U.S.C. 154(b) by 228 days.

(21) Appl. No.: 14/811,886

(22) Filed: Jul. 29, 2015

(65) Prior Publication Data

US 2016/0090114 A1 Mar. 31, 2016

Related U.S. Application Data

(60) Provisional application No. 62/056,930, filed on Sep. 29, 2014.

(51) Int. Cl.
| | |
|---|---|
| *B62B 5/00* | (2006.01) |
| *B62B 3/00* | (2006.01) |
| *B62B 5/06* | (2006.01) |
| *B60D 1/58* | (2006.01) |
| *B60D 1/00* | (2006.01) |

(52) U.S. Cl.
CPC .............. *B62B 5/0079* (2013.01); *B60D 1/58* (2013.01); *B62B 3/001* (2013.01); *B62B 3/007* (2013.01); *B62B 5/067* (2013.01); *B60D 2001/006* (2013.01)

(58) Field of Classification Search
CPC ......... B60D 1/58; B62B 5/0079; B62B 3/001; B62B 3/007; B62B 5/067
USPC ......................................... 280/415.1
See application file for complete search history.

(56) References Cited

U.S. PATENT DOCUMENTS

| | | | | |
|---|---|---|---|---|
| 4,744,590 | A * | 5/1988 | Chesney | B60R 9/06 224/520 |
| 5,249,821 | A * | 10/1993 | Ricketts | B62D 63/061 280/638 |
| 6,846,017 | B2 | 7/2005 | Martin | |
| 6,948,732 | B2 * | 9/2005 | Amacker | B60R 9/06 280/415.1 |
| 7,380,803 | B2 | 6/2008 | Thomas | |
| 7,641,235 | B1 * | 1/2010 | Anduss | B60R 9/06 224/509 |
| 7,770,913 | B2 * | 8/2010 | Cannon | B62D 63/061 280/278 |
| 7,905,508 | B2 | 3/2011 | Crawford et al. | |
| 8,672,200 | B2 | 3/2014 | O'Hare | |
| D705,704 | S | 5/2014 | Lane | |
| D708,099 | S | 7/2014 | Oman | |
| D709,804 | S | 7/2014 | Provost | |
| D709,805 | S | 7/2014 | Hill | |
| D714,194 | S | 9/2014 | DePietro | |
| D729,703 | S | 5/2015 | Song | |
| D729,704 | S | 5/2015 | Song | |
| D737,734 | S | 9/2015 | McGinnes | |

(Continued)

*Primary Examiner* — Jacob D Knutson
(74) *Attorney, Agent, or Firm* — Withers & Keys, LLC

(57) ABSTRACT

Trailer hitch attachable carts are disclosed. Methods of making trailer hitch attachable carts, and methods of using trailer hitch attachable carts are also disclosed.

20 Claims, 19 Drawing Sheets

(56) References Cited

U.S. PATENT DOCUMENTS

| | | |
|---|---|---|
| D738,796 S | 9/2015 | DePietro |
| 9,145,154 B1* | 9/2015 | Horowitz ................ B62B 3/025 |
| 2004/0173654 A1* | 9/2004 | McAlister ................ B60D 1/52 |
| | | 224/519 |
| 2006/0118586 A1 | 6/2006 | Heravi |
| 2008/0073871 A1* | 3/2008 | Winkel .................... B62B 1/12 |
| | | 280/415.1 |
| 2009/0146394 A1* | 6/2009 | Seivert .................... B60R 9/06 |
| | | 280/504 |
| 2010/0066069 A1 | 3/2010 | Bradshaw |
| 2013/0033028 A1* | 2/2013 | Hux ......................... B60R 9/06 |
| | | 280/769 |

* cited by examiner

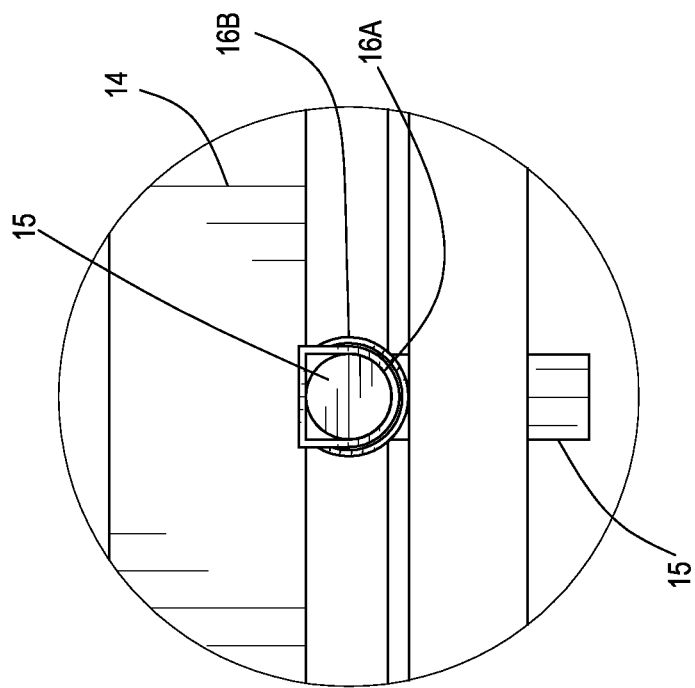
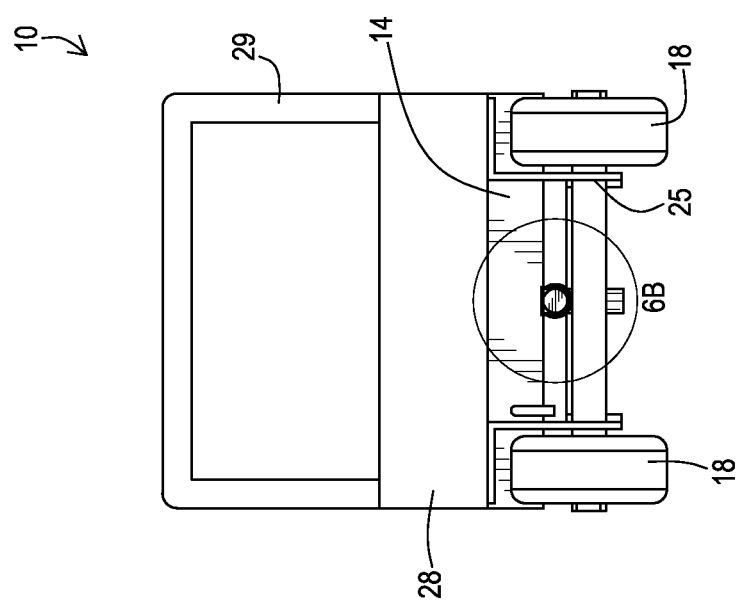

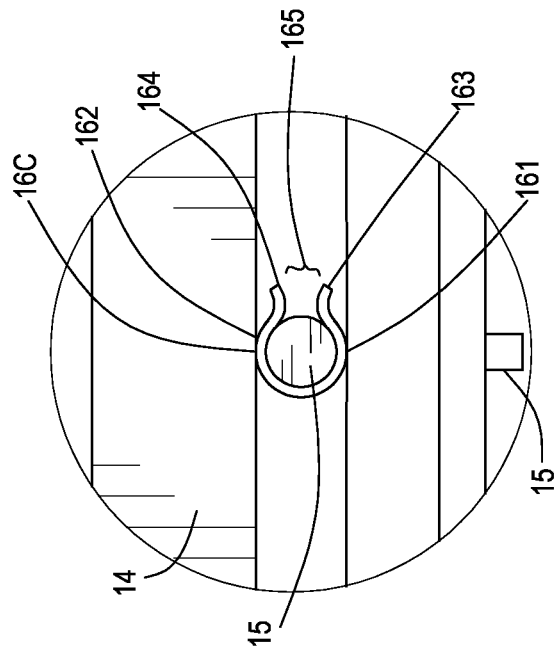
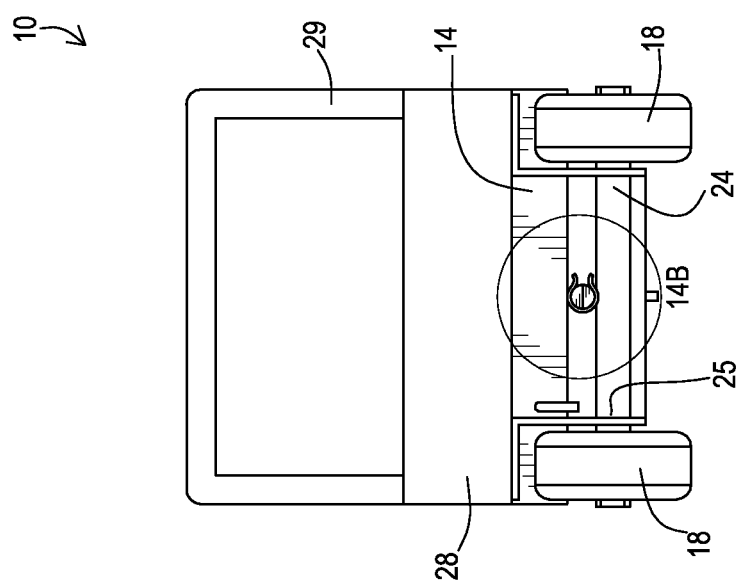
FIG. 14B
FIG. 14A

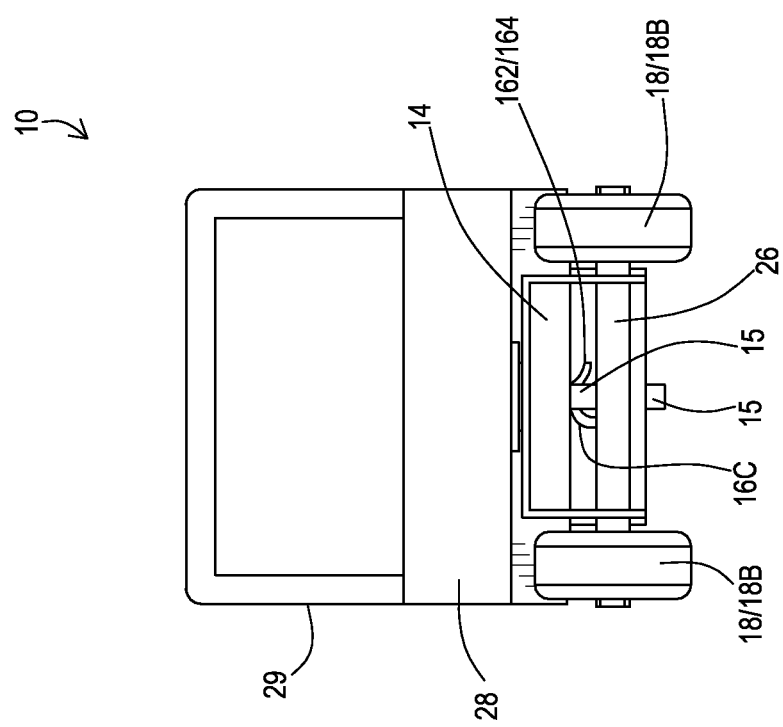

TRAILER HITCH ATTACHABLE CARTS AND METHODS OF MAKING AND USING THE SAME

CROSS-REFERENCE TO RELATED APPLICATIONS

This patent application claims the benefit of priority to U.S. provisional patent application Ser. No. 62/056,930 entitled "TRAILER HITCH ATTACHABLE CARTS AND METHODS OF MAKING AND USING THE SAME" filed on Sep. 29, 2014, the subject matter of which is incorporated herein in its entirety.

FIELD OF THE INVENTION

The present invention relates to trailer hitch attachable carts. The present invention also relates to methods of making trailer hitch attachable carts and methods of using trailer hitch attachable carts.

BACKGROUND OF THE INVENTION

Efforts continue to provide innovative and useful trailer hitch attachable carts.

SUMMARY OF THE INVENTION

The present invention provides new trailer hitch attachable carts. The trailer hitch attachable carts of the present invention provide one or more of the following benefits: (1) ease to produce; (2) ease of use; (3) exceptional design; and (4) ergonomic design.

Accordingly, in one exemplary embodiment, the present invention is directed to trailer hitch attachable carts. In some exemplary embodiments of the present invention, the trailer hitch attachable cart comprises: a cart platform, said cart platform having an upper major surface, a lower major surface opposite said upper major surface, a platform length, and a platform width; a first tubular member attached to said lower major surface, said first tubular member having a first size and a first cross-sectional shape so as to enable attachment of said cart to a trailer hitch receiving member; a cart handle; and a storage system for storing said cart handle when in a storage position, said storage system comprising one or more cart handle seating members attached to said lower major surface, each of said one or more cart handle seating members being sized to accept and support a portion of said cart handle therethrough.

In some exemplary embodiments of the present invention, the trailer hitch attachable cart comprises: a cart platform, said cart platform having an upper major surface, a lower major surface opposite said upper major surface, a platform length, and a platform width; a first tubular member attached to said lower major surface, said first tubular member having a first size and a first cross-sectional shape so as to enable attachment of said cart to a trailer hitch receiving member; a second tubular member having a second size and a second cross-sectional shape so as to be snugly positioned within said first tubular member, said second tubular member having a first engagement end sized to be snugly positioned within said first tubular member, and a second engagement end, opposite said first engagement end, sized to be snugly positioned within a trailer hitch receiving member; and three or more wheels (i) permanently attached to said lower major surface of said cart platform and (ii) extending below said first tubular member.

In some exemplary embodiments of the present invention, the trailer hitch attachable cart comprises: a cart platform extending within a plane, said cart platform having an upper major surface, a lower major surface opposite said upper major surface, a platform length within said plane, and a platform width within said plane; a first tubular member attached to said lower major surface, said first tubular member having a first size and a first cross-sectional shape so as to enable attachment of said cart to a trailer hitch receiving member; a rotatable cart handle; and a storage system for storing said rotatable cart handle when in a storage position, said storage system comprising one or more cart handle seating members attached to said lower major surface, each of said one or more cart handle seating members being sized to accept and support a portion of said rotatable cart handle therethrough.

In other exemplary embodiments of the present invention, the trailer hitch attachable cart comprises: a cart platform extending within a plane, said cart platform having an upper major surface, a lower major surface opposite said upper major surface, a platform length within said plane, and a platform width within said plane; a first tubular member attached directly to said lower major surface, said first tubular member having a first size and a first cross-sectional shape so as to enable attachment of said cart to a trailer hitch receiving member; a second tubular member having a second size and a second cross-sectional shape so as to be snugly positioned within said first tubular member, said second tubular member having a first engagement end sized to be snugly positioned within said first tubular member, and a second engagement end, opposite said first engagement end, sized to be snugly positioned within a trailer hitch receiving member; and three or more wheels (i) permanently attached to said lower major surface of said cart platform and (ii) extending below said first tubular member.

As discussed further below, any of the herein-disclosed trailer hitch attachable carts may comprise a variety of components so as to provide a trailer hitch attachable cart having a desired set of features.

The present invention is even further directed to methods of making trailer hitch attachable carts. In some exemplary embodiments of the present invention, the method of making a trailer hitch attachable cart comprises: assembling cart components so as to form a cart platform extending within a plane, said cart platform having an upper major surface, a lower major surface opposite said upper major surface, a platform length within said plane, and a platform width within said plane; a first tubular member attached to said lower major surface, said first tubular member having a first size and a first cross-sectional shape so as to enable attachment of said cart to a trailer hitch receiving member; a rotatable cart handle; and a storage system for storing said rotatable cart handle when in a storage position, said storage system comprising one or more cart handle seating members attached to said lower major surface, each of said one or more cart handle seating members being sized to accept and support a portion of said rotatable cart handle therethrough.

In other exemplary embodiments of the present invention, the method of making a trailer hitch attachable cart comprises: assembling cart components so as to form a cart platform extending within a plane, said cart platform having an upper major surface, a lower major surface opposite said upper major surface, a platform length within said plane, and a platform width within said plane; a first tubular member attached directly to said lower major surface, said first tubular member having a first size and a first cross-sectional shape so as to enable attachment of said cart to a trailer hitch receiving member; a second tubular member having a second size and a second cross-sectional shape so as to be snugly positioned within said first tubular member, said second tubular member having a first engagement end sized to be snugly positioned within said first tubular member, and a second engagement end, opposite said first engagement end, sized to be snugly positioned within a trailer hitch receiving member; and three or more wheels (i) permanently attached to said lower major surface of said cart platform and (ii) extending below said first tubular member.

The present invention is even further directed to a method of using trailer hitch attachable carts. In one exemplary embodiment, the method of using a trailer hitch attachable cart comprises: attaching any one of the herein-described trailer hitch attachable carts to a trailer hitch receiving member of a vehicle. Methods of using a trailer hitch attachable cart of the present invention may further comprise one of more additional steps including, but not limited to, securing one or more items to the cart platform of the cart; detaching the trailer hitch attachable cart from the trailer hitch receiving member of the vehicle; detaching the rotatable cart handle from the trailer hitch attachable cart; storing the rotatable cart handle underneath the cart platform via the one or more cart handle seating members; removing the rotatable cart handle from the one or more cart handle seating members underneath the cart platform; attaching the rotatable cart handle to the trailer hitch attachable cart; and moving the trailer hitch attachable cart from one location to another location by applying a pulling force on the rotatable cart handle. The methods of using any of the herein-described trailer hitch attachable carts may be practiced using vehicles such as a car, a truck, an all-terrain vehicle, or a bus.

These and other features and advantages of the present invention will become apparent after a review of the following detailed description of the disclosed embodiments and the appended claims.

BRIEF DESCRIPTION OF THE FIGURES

FIG. 6A is a side view of the exemplary trailer hitch attachable cart of FIG. 1 as viewed from the right-hand side of the exemplary trailer hitch attachable cart as shown in FIG. 5;

FIG. 6B is an exploded view of the area labeled "6B" in FIG. 6A;

FIG. 14A is a side view of the exemplary trailer hitch attachable cart of FIG. 9 as viewed from the right-hand side of the exemplary trailer hitch attachable cart as shown in FIG. 13;

FIG. 14B is an exploded view of the area labeled "14B" in FIG. 14A;

FIG. 15 is a side view of the exemplary trailer hitch attachable cart of FIG. 9 as viewed from the left-hand side of the trailer hitch attachable cart as shown in FIG. 13;

DETAILED DESCRIPTION OF THE INVENTION

Figure 1:
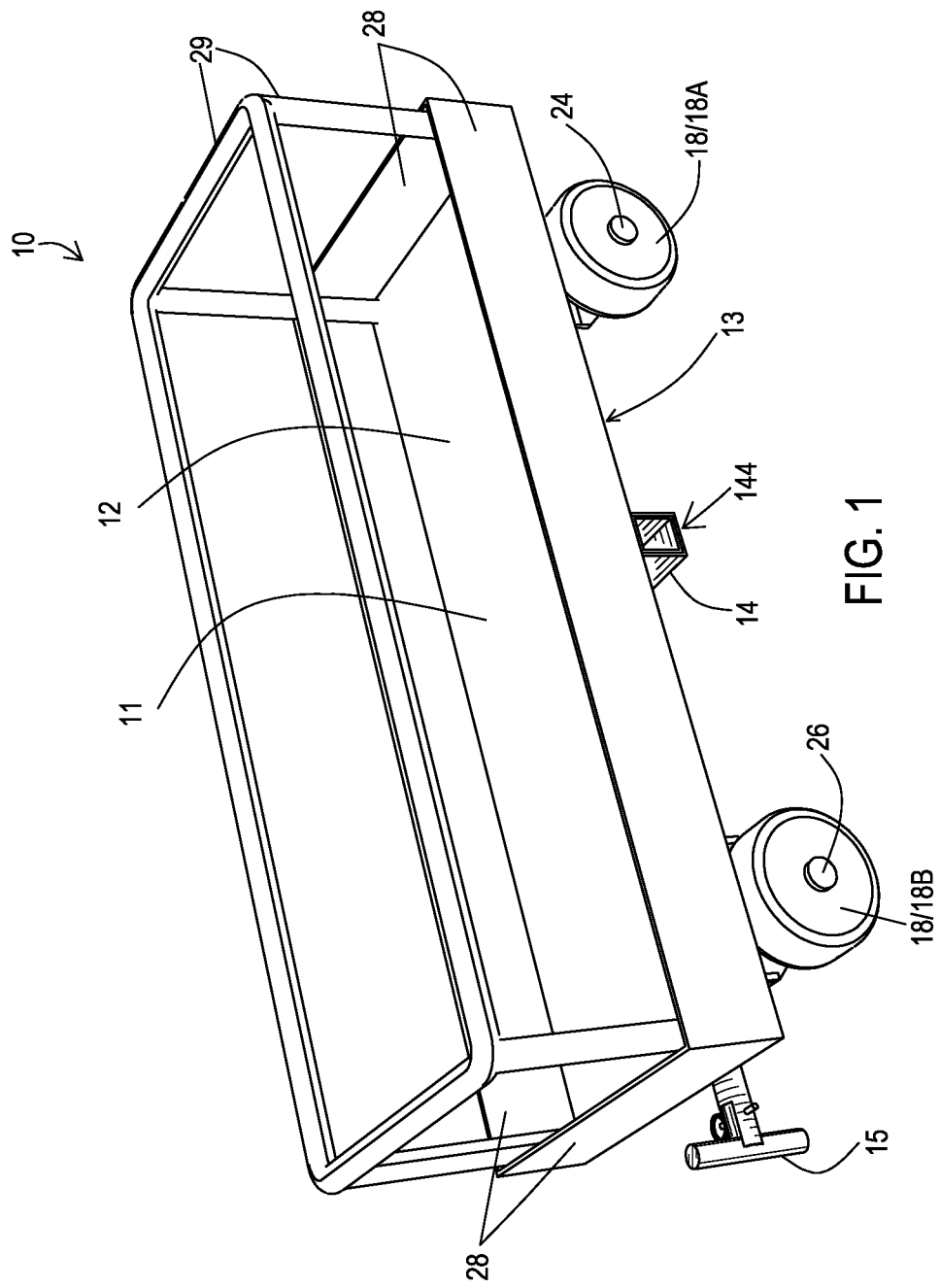
FIG. 1 is a perspective view of an exemplary trailer hitch attachable cart of the present invention.
Figure 2:
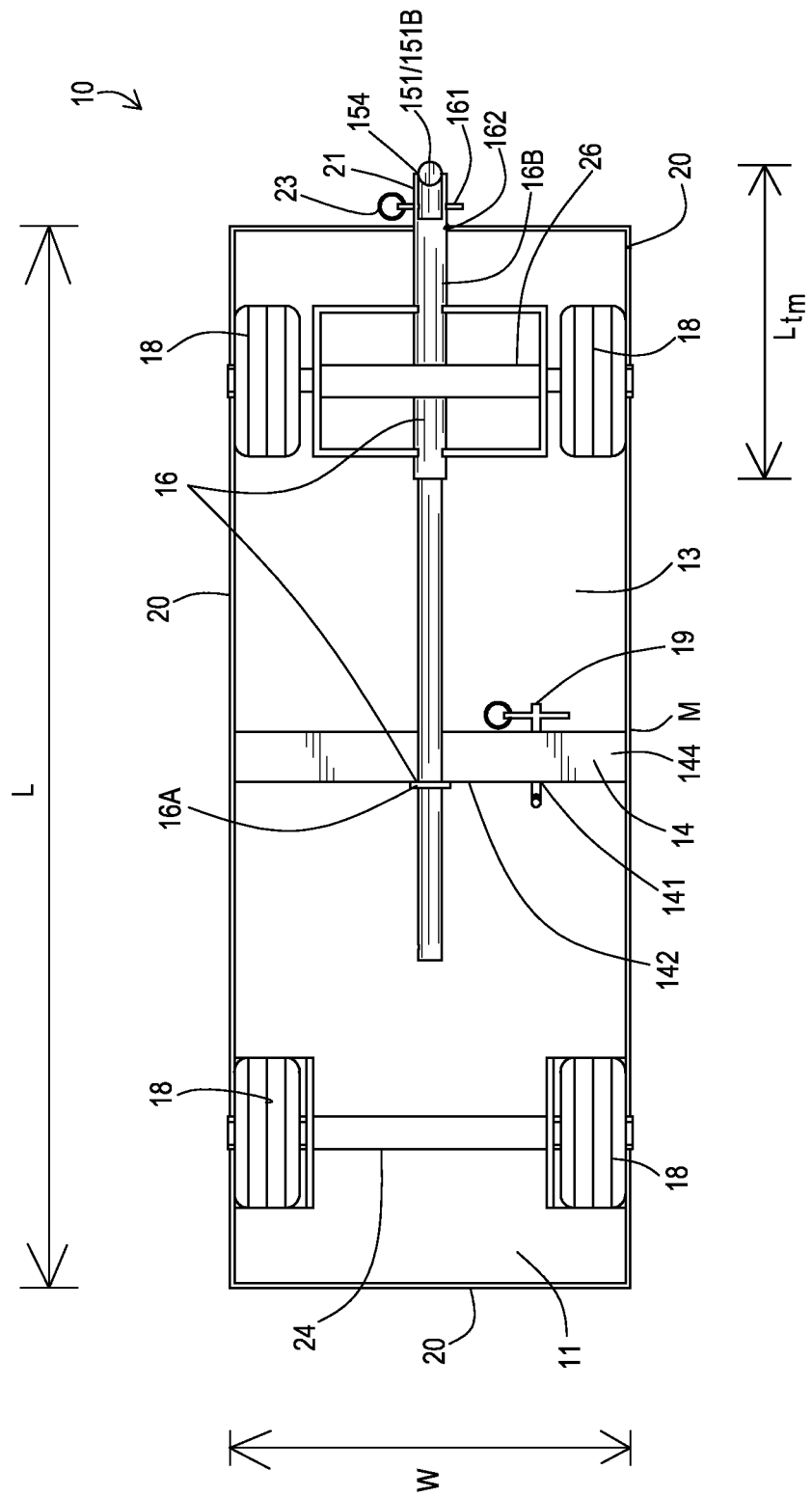
FIG. 2 is a bottom view of the exemplary trailer hitch attachable cart of FIG. 1 showing a rotatable cart handle in a storage position.
Figure 3:
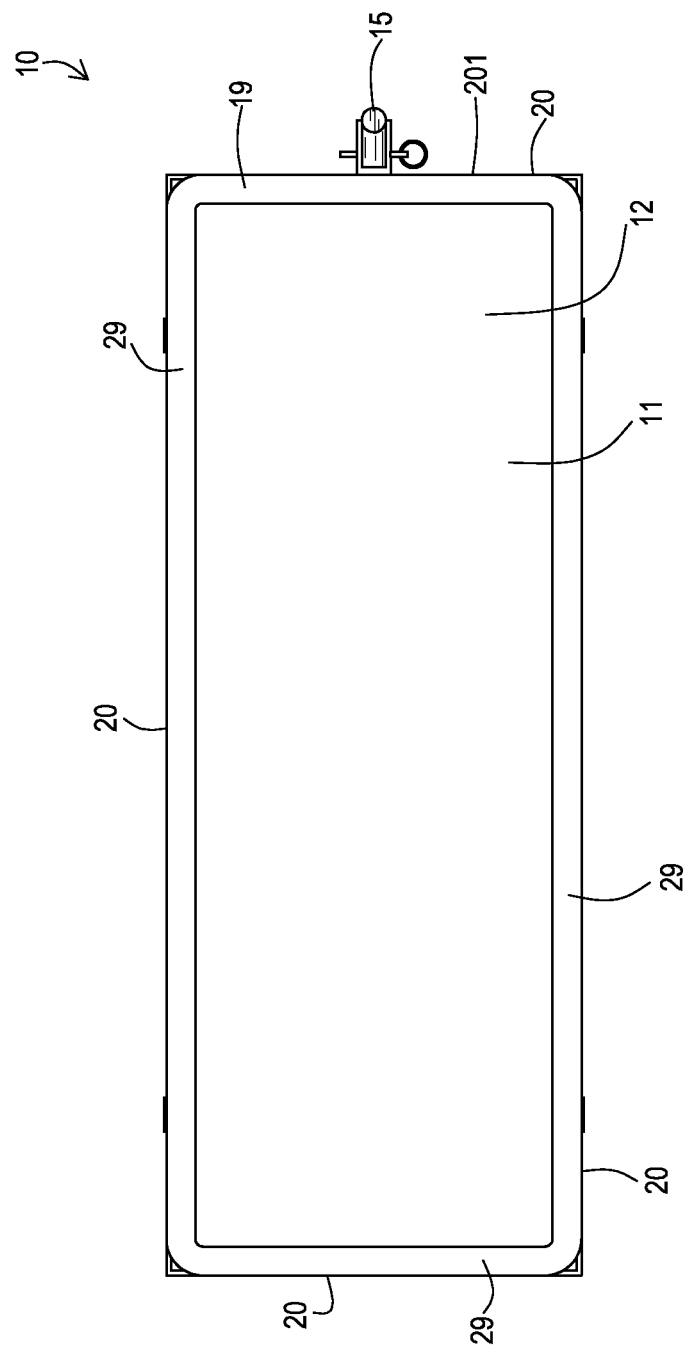
FIG. 3 is a top view of the exemplary trailer hitch attachable cart of FIG. 1.
Figure 4:
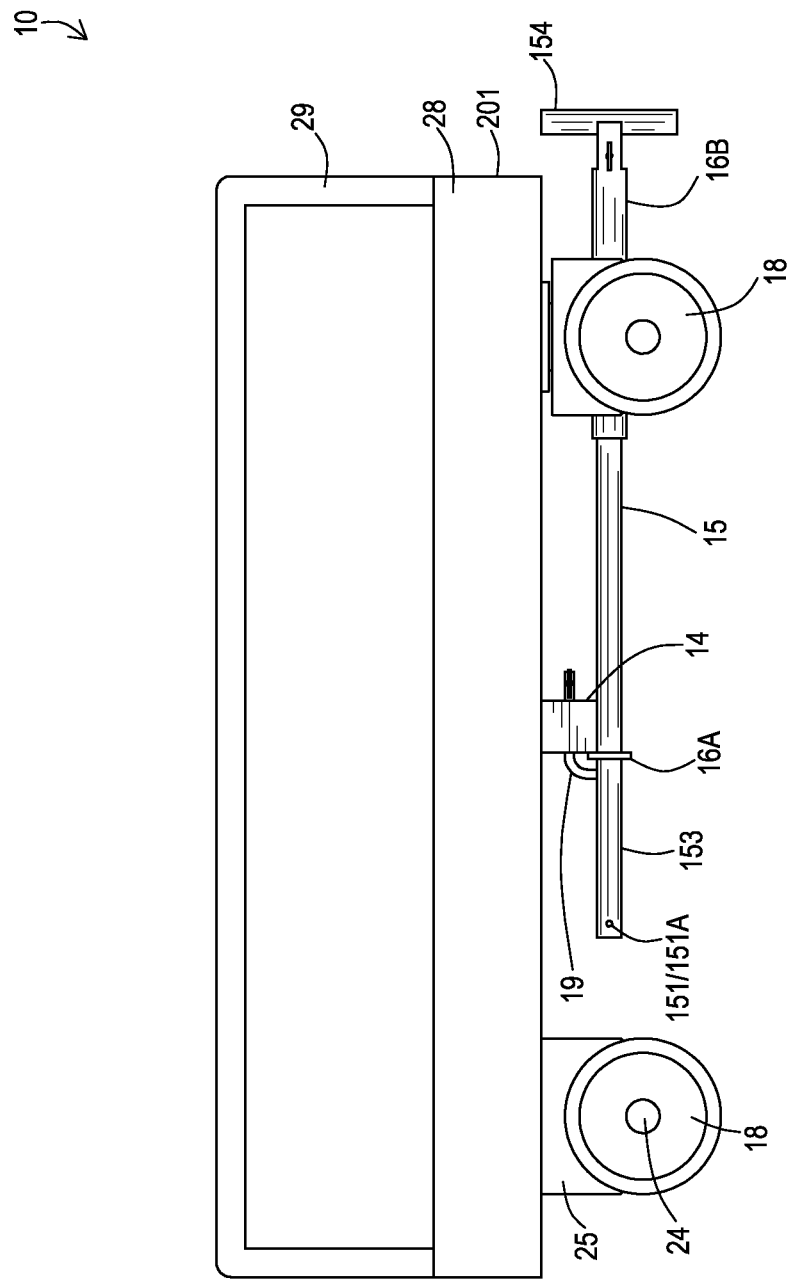
FIG. 4 is a rear view of the exemplary trailer hitch attachable cart of FIG. 1.
Figure 5:
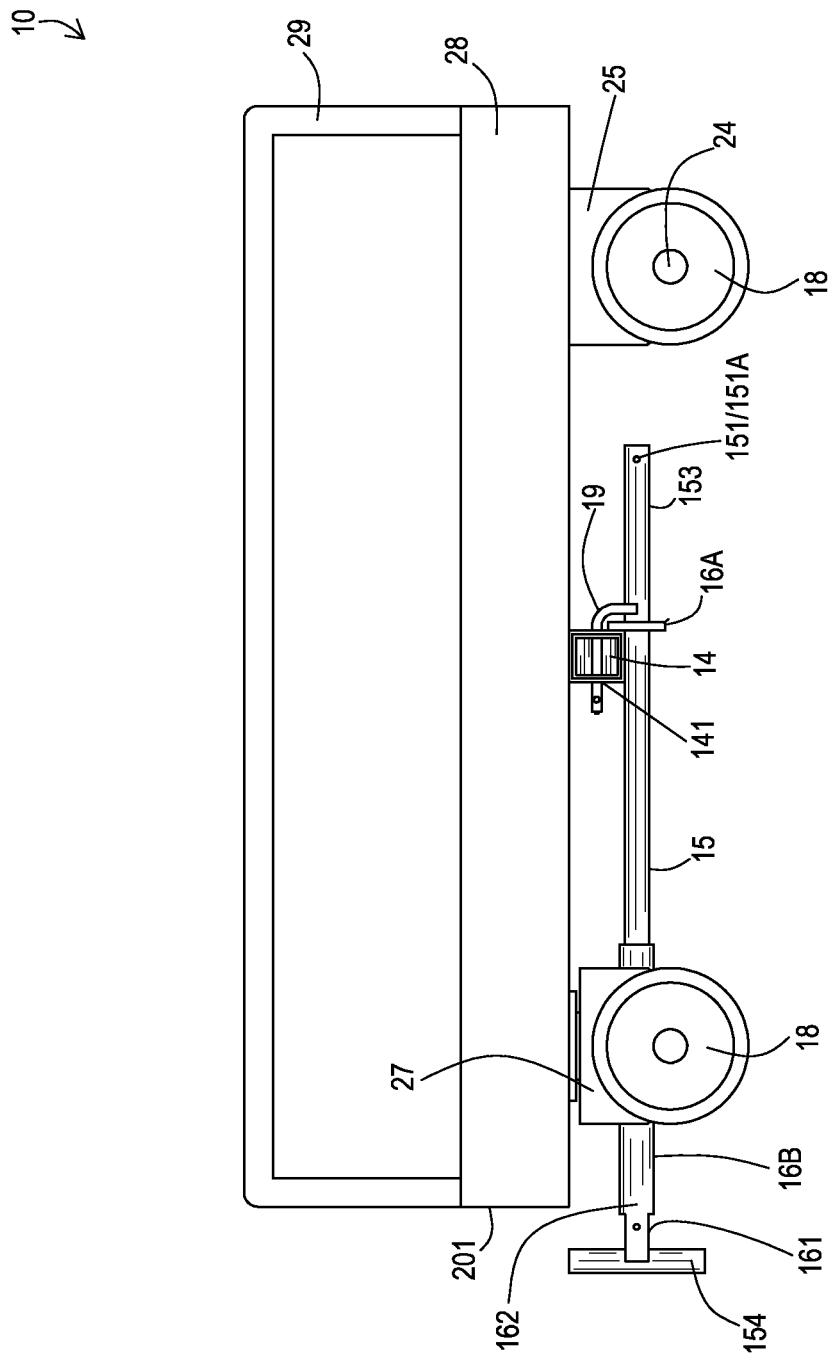
FIG. 5 is a frontal view of the exemplary trailer hitch attachable cart of FIG. 1.
Figure 7:
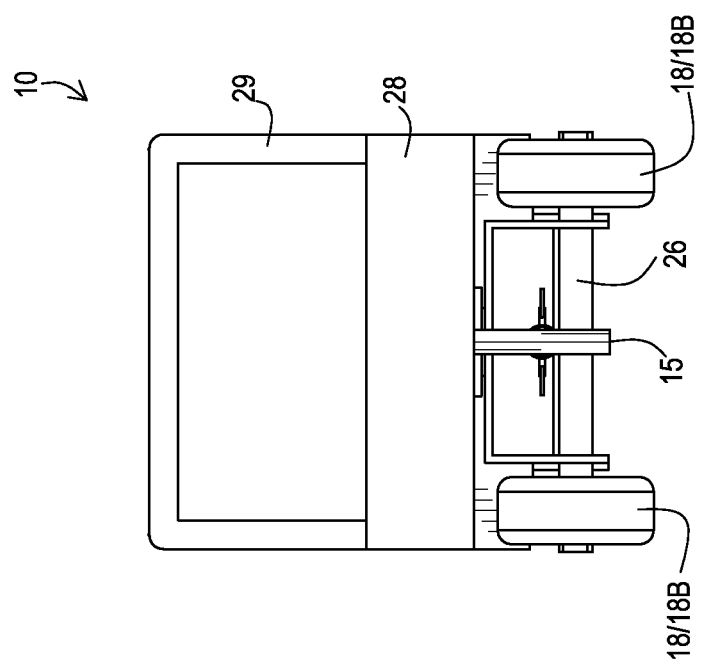
FIG. 7 is a side view of the exemplary trailer hitch attachable cart of FIG. 1 as viewed from the left-hand side of the trailer hitch attachable cart as shown in FIG. 5.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to trailer hitch attachable carts. The present invention is further directed to methods of making trailer hitch attachable carts. The present invention is even further directed to methods of using trailer hitch attachable carts.

The trailer hitch attachable carts of the present invention and methods of making and using trailer hitch attachable carts of the present invention are further described in the embodiments below.

Trailer Hitch Attachable Cart Embodiments:

1. A trailer hitch attachable cart 10, said cart 10 comprising: a cart platform 11, said cart platform 11 having an upper major surface 12, a lower major surface 13 opposite said upper major surface 12, a platform length L, and a platform width W; a first tubular member 14 attached to said lower major surface 13, said first tubular member 14 having a first size and a first cross-sectional shape so as to enable attachment of said cart 10 to a trailer hitch receiving member (not shown); a cart handle 15; and a storage system 16 for storing said cart handle 15 when in a storage position, said storage system 16 comprising one or more cart handle seating members 16 attached to said lower major surface 13, each of said one or more cart handle seating members 16 being sized to accept and support a portion of said cart handle 15 therethrough. FIGS. 1-2, 4-7, 9-10, 12-15 and 17 show cart handle 15 in a storage position.

2. A trailer hitch attachable cart 10, said cart 10 comprising: a cart platform 11 extending within a plane, said cart platform 11 having an upper major surface 12, a lower major surface 13 opposite said upper major surface 12, a platform length L within said plane, and a platform width W within said plane; a first tubular member 14 attached to said lower major surface 13, said first tubular member 14 having a first size and a first cross-sectional shape so as to enable attachment of said cart 10 to a trailer hitch receiving member (not shown); a rotatable cart handle 15; and a storage system 16 for storing said rotatable cart handle 15 when in a storage position, said storage system 16 comprising one or more cart handle seating members 16 attached to said lower major surface 13, each of said one or more cart handle seating members 16 being sized to accept and support a portion of said rotatable cart handle 15 therethrough. FIGS. 1-2, 4-7, 9-10, 12-15 and 17 show rotatable cart handle 15 in a storage position.

3. A trailer hitch attachable cart 10, said cart 10 comprising: a cart platform 11, said cart platform 11 having an upper major surface 12, a lower major surface 13 opposite said upper major surface 12, a platform length L, and a platform width W; a first tubular member 14 attached to said lower major surface 13, said first tubular member 14 having a first size and a first cross-sectional shape so as to enable attachment of said cart 10 to a trailer hitch receiving member (not shown); a second tubular member 17 having a second size and a second cross-sectional shape so as to be snugly positioned within said first tubular member 14, said second tubular member 17 having a first engagement end 17A sized to be snugly positioned within said first tubular member 14, and a second engagement end 17B, opposite said first engagement end 17B, sized to be snugly positioned within a trailer hitch receiving member (not shown); and three or more wheels 18 (i) permanently attached to said lower major surface 13 of said cart platform 10 and (ii) extending below said first tubular member 14. As used herein, the phrase "permanently attached" describes wheels that are attached in a fixed position to said lower major surface 13 of said cart platform 10, and not meant to be removed unless replaced due to wear. Typically, each wheel has a similar wheel size and shape. In some embodiments, each wheel has an overall diameter of from about 3.0 inches (in.) to about 12.0 in. (or any value between 3.0 in. and 12.0 in., in increments of 0.1 in., e.g., 8.5 in., or any range of values between 3.0 in. and 12.0. in, in increments of 0.1 in., e.g., 3.4 in. to 9.8 in.), and a wheel width of from about 2.0 in. to about 7.5 in. (or any value between 2.0 in. and 7.5 in., in increments of 0.1 in., e.g., 5.0 in., or any range of values between 2.0 in. and 7.5 in., in increments of 0.1 in., e.g., 3.8 in. to 5.8 in.). In one desired embodiment, each wheel has an overall diameter of about 8.5 in. and a wheel width of about 5.0 in.

4. A trailer hitch attachable cart 10, said cart 10 comprising: a cart platform 11 extending within a plane, said cart platform 11 having an upper major surface 12, a lower major surface 13 opposite said upper major surface 12, a platform length L within said plane, and a platform width W within said plane; a first tubular member 14 attached to said lower major surface 13, said first tubular member 14 having a first size and a first cross-sectional shape so as to enable attachment of said cart 10 to a trailer hitch receiving member (not shown); a second tubular member 17 having a second size and a second cross-sectional shape so as to be snugly positioned within said first tubular member 14, said second tubular member 17 having a first engagement end 17A sized to be snugly positioned within said first tubular member 14, and a second engagement end 17B, opposite said first engagement end 17B, sized to be snugly positioned within a trailer hitch receiving member (not shown); and three or more wheels 18 (i) permanently attached to said lower major surface 13 of said cart platform 10 and (ii) extending below said first tubular member 14.

5. The trailer hitch attachable cart 10 of embodiment 1, said cart handle 15 comprises a rotatable cart handle 15.

6. The trailer hitch attachable cart 10 of any one of embodiments 1 or 3 to 5, said cart platform 11 extends within a plane, said platform length L extends within said plane, and said platform width W extends within said plane.

7. The trailer hitch attachable cart 10 of any one of embodiments 1 to 6, wherein said first tubular member 14 is attached directly to said lower major surface 13.

8. The trailer hitch attachable cart 10 of any one of embodiments 1, 2 and 5 to 7, wherein said cart 10 further comprises a second tubular member 17 having a second size and a second cross-sectional shape so as to be snugly positioned within said first tubular member 14, said second tubular member 17 having a first engagement end 17A sized to be snugly positioned within said first tubular member 14, and a second engagement end 17B, opposite said first engagement end 17A, sized to be snugly positioned within a trailer hitch receiving member (not shown).

9. The trailer hitch attachable cart 10 of any one of embodiments 1, 2 and 5 to 8, wherein said cart 10 further comprises three or more wheels 18 (i) permanently attached to said lower major surface 13 of said cart platform 11 and (ii) extending below said first tubular member 14.

10. The trailer hitch attachable cart 10 of any one of embodiments 3 to 9, wherein said cart 10 further comprises: a cart handle 15; and a storage system 16 for storing said cart handle 15 when in a storage position, said storage system 16 comprising one or more cart handle seating members 16 attached to said lower major surface 13, each of said one or more cart handle seating members 16 being sized to accept and support a portion of said cart handle 15 therethrough.

11. The trailer hitch attachable cart 10 of any one of embodiments 1 to 10, wherein said platform length L is greater than said platform width W.

12. The trailer hitch attachable cart 10 of any one of embodiments 1 to 11, wherein said platform length L is approximately equal to a width of a vehicle (not shown), said vehicle comprising a car, a truck, an all-terrain vehicle, or a bus.

13. The trailer hitch attachable cart 10 of any one of embodiments 1 to 12, wherein said first tubular member 14 is positioned at an approximate midpoint M of said platform length L, and extends in a direction aligned with said platform width W. See, for example, FIG. 2.

14. The trailer hitch attachable cart 10 of any one of embodiments 1 to 13, wherein said first tubular member 14 comprising two or more first holes 141 extending through a side wall 142 thereof, each of said first holes 141 being sized and shaped so as to receive a first pin member 19 therethrough.

15. The trailer hitch attachable cart 10 of any one of embodiments 3 to 14, wherein said second tubular member 17 comprising two or more second holes 171 extending through a side wall 172 thereof, each of said second holes 171 being sized and shaped so as to receive a first pin member 19 therethrough.

Figure 8:
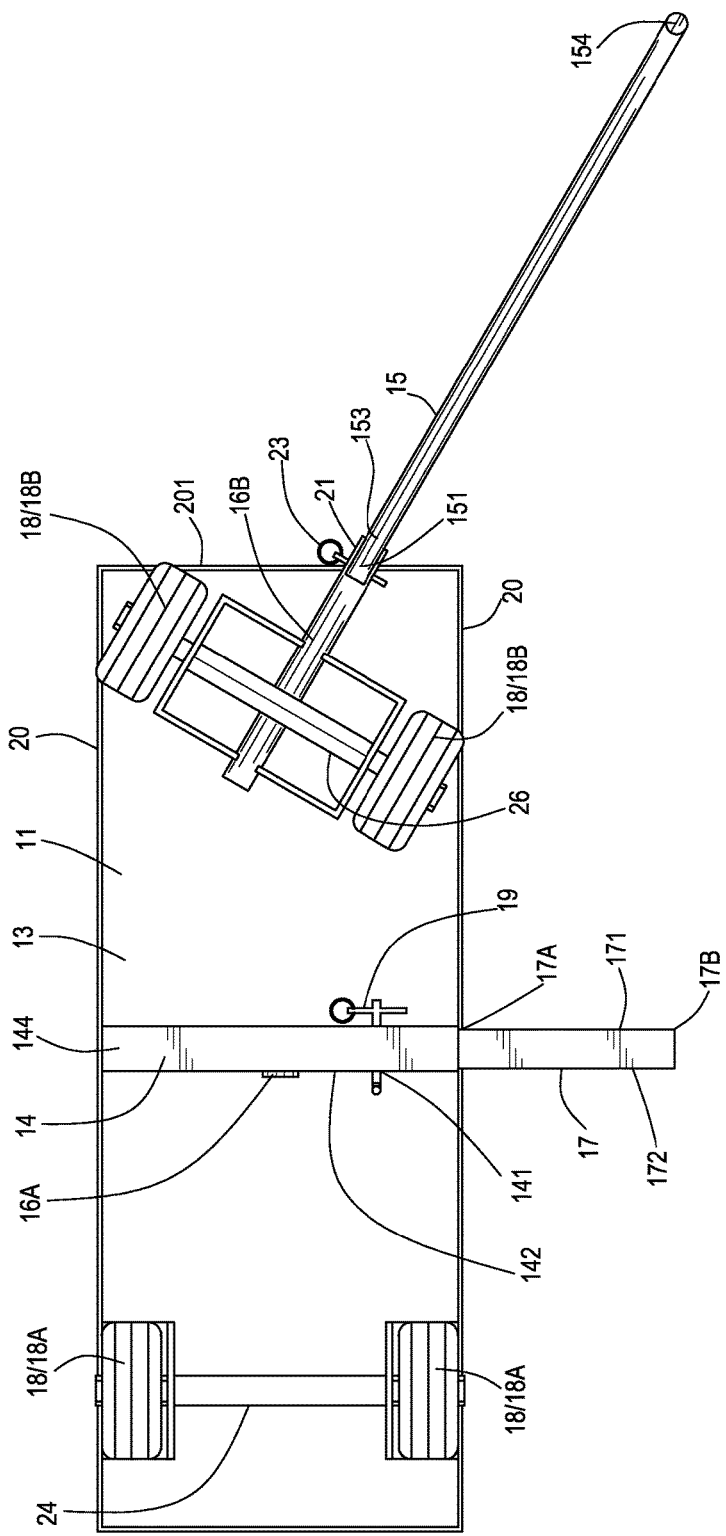
FIG. 8 is a bottom view of the exemplary trailer hitch attachable cart of FIG. 1 showing (i) the rotatable cart handle in a use position, and (ii) an extendable tubular member sized to fit within a trailer hitch receiver.
Figure 9:
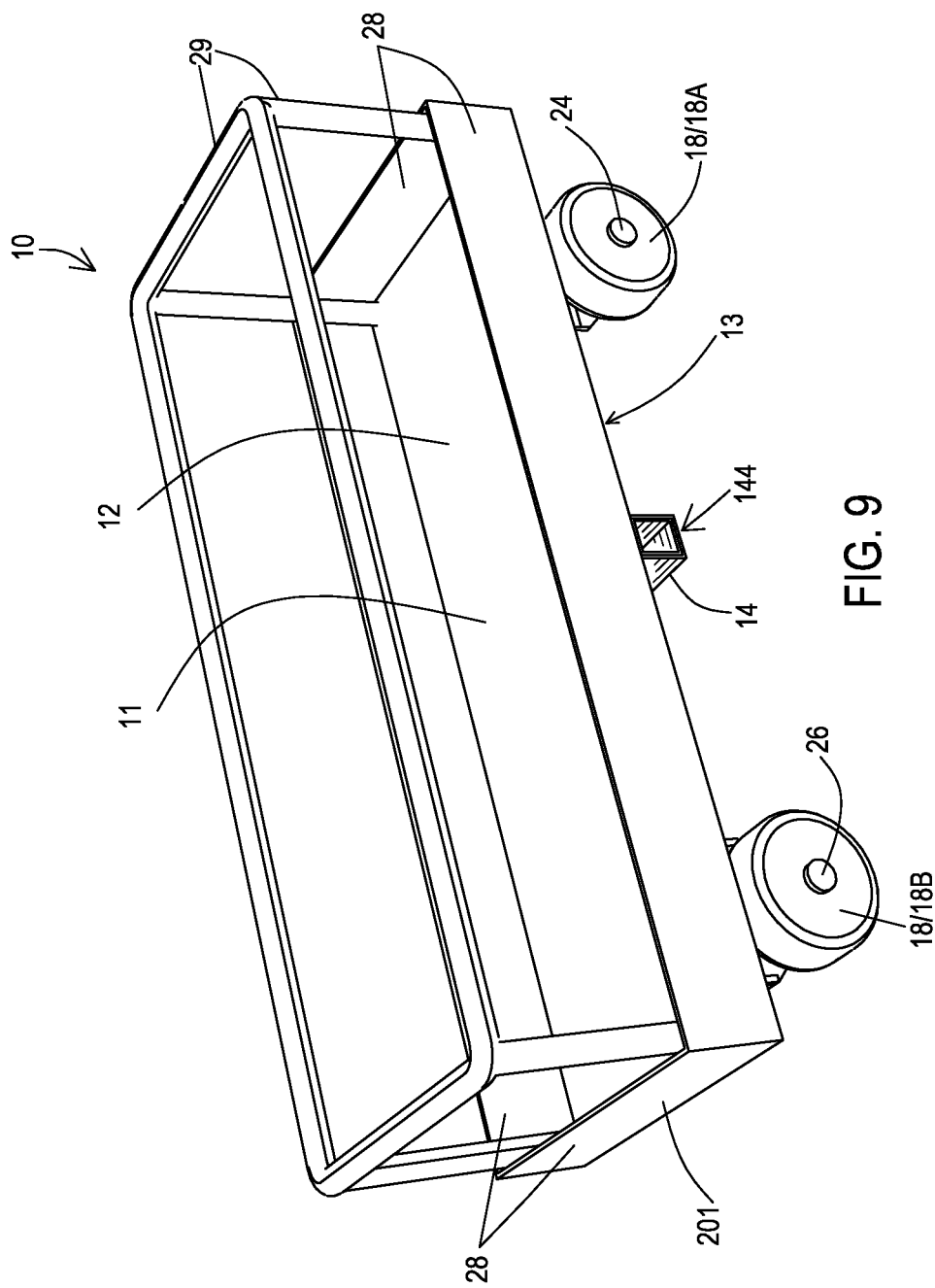
FIG. 9 is a perspective view of another exemplary trailer hitch attachable cart of the present invention.
Figure 10:
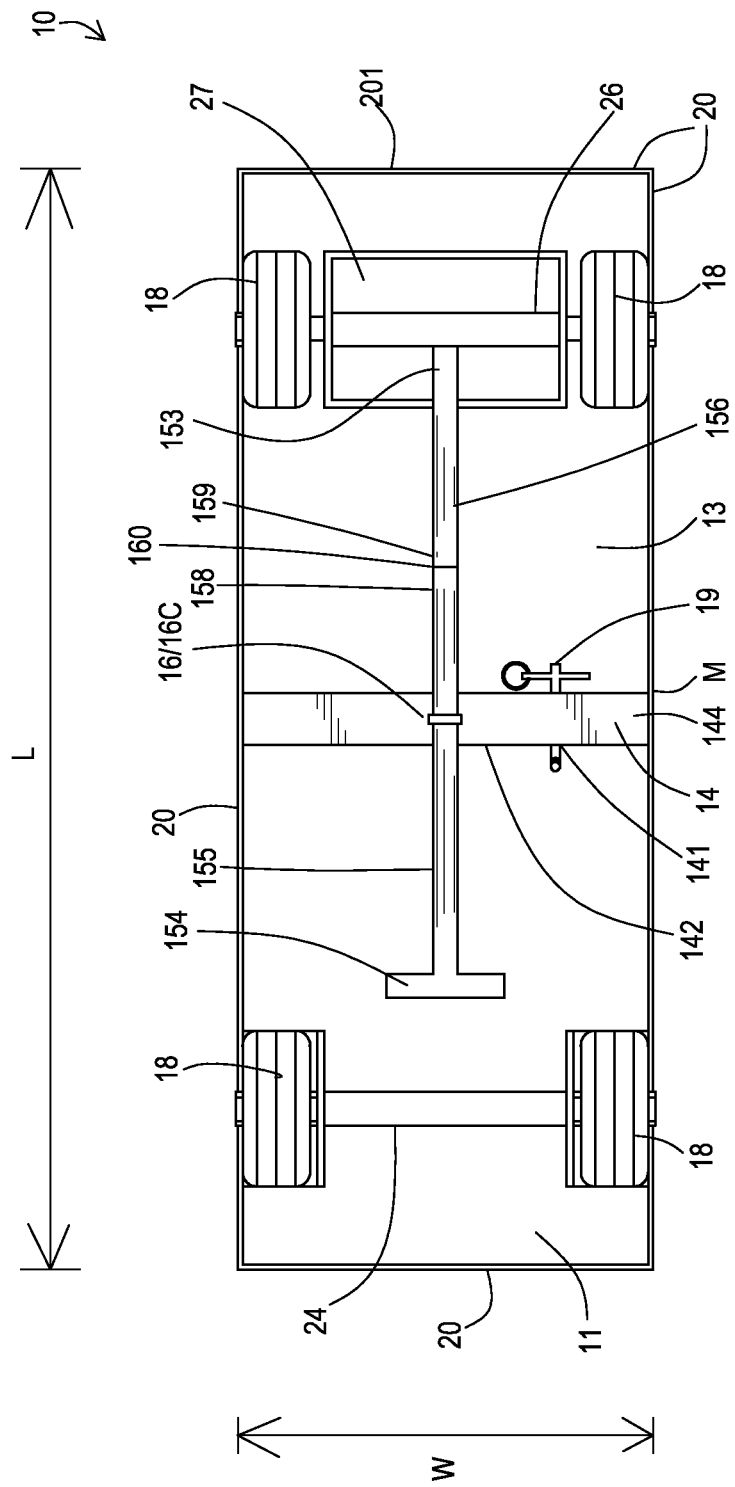
FIG. 10 is a bottom view of the exemplary trailer hitch attachable cart of FIG. 9 showing a rotatable cart handle in a storage position.
Figure 11:
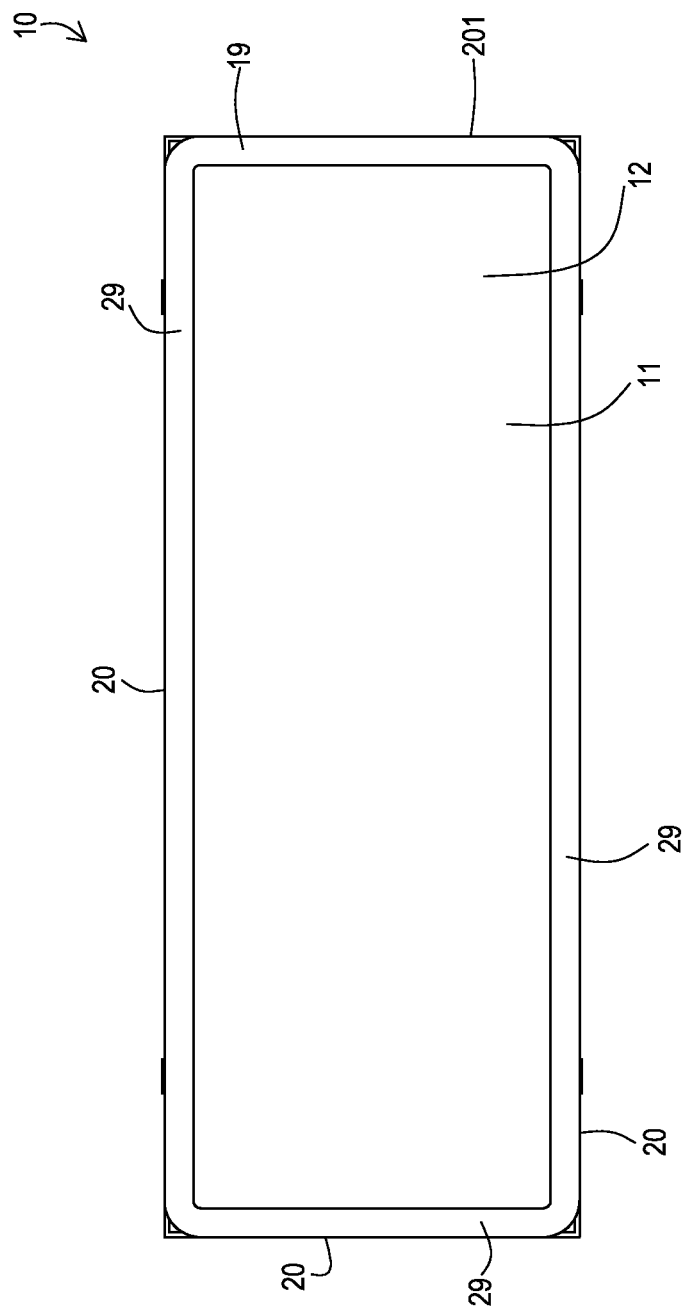
FIG. 11 is a top view of the exemplary trailer hitch attachable cart of FIG. 9.
Figure 12:
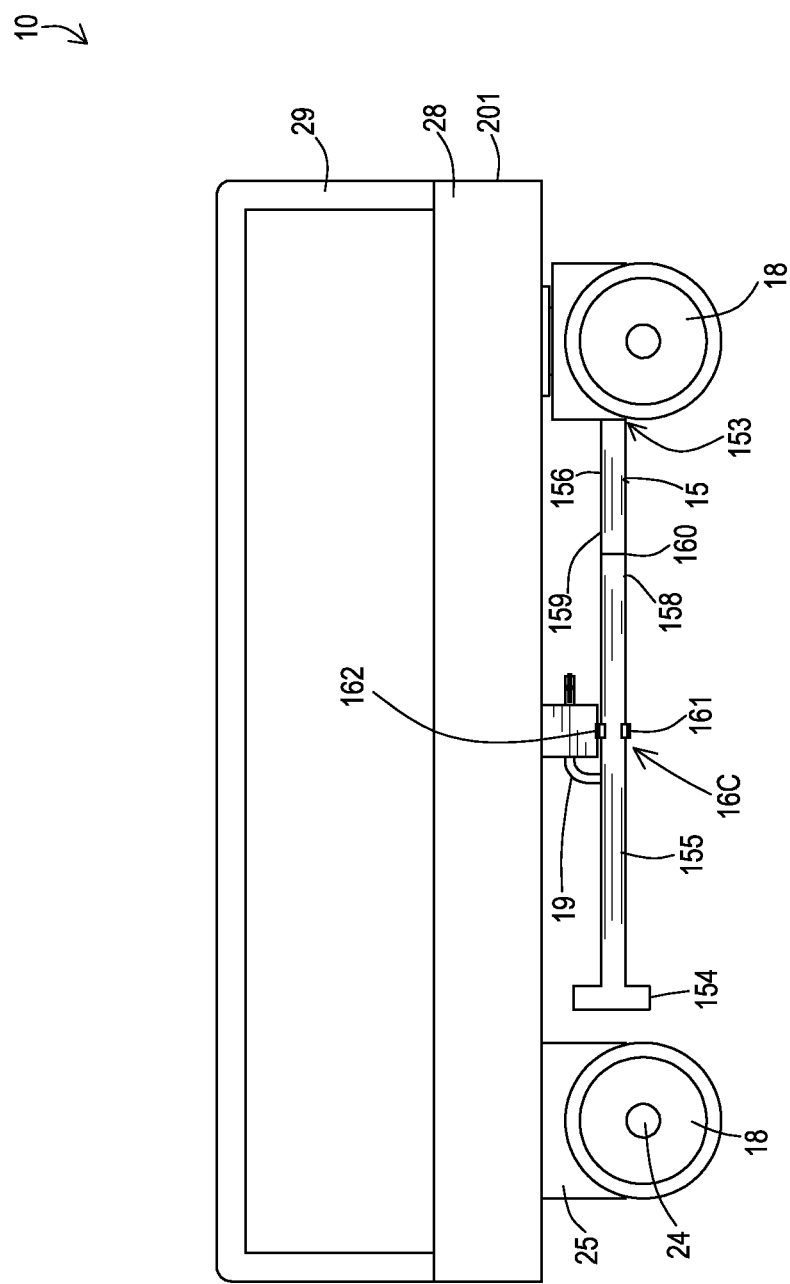
FIG. 12 is a rear view of the exemplary trailer hitch attachable cart of FIG. 9.

16. The trailer hitch attachable cart 10 of embodiment 15, further comprising a first pin member 19, said first pin member 19 being sized to extend within (i) any one of said two or more first holes 141, and (ii) any one of said two or more second holes 171, said first pin member 19 being insertable within (1) a first pair of a first hole 141 and a second hole 171 so as to lock said second tubular member 17 in said storage position within said first tubular member 14 (see, FIG. 2), and (ii) a second pair of a first hole 141 and a second hole 171 so as to lock said second tubular member 17 in use position wherein a portion of second tubular member 17 extends from and out of said first tubular member 14 (see, FIG. 8).

17. The trailer hitch attachable cart 10 of any one of embodiments 1, 2 and 5 to 16, wherein said one or more cart handle seating members 16 comprise at least two loop members 16 comprise: (i) a ring-like loop member 16A attached to and extending downward from said first tubular member 14, and (ii) a tubular loop member 16B positioned between said ring-like loop member 16A and an outer edge 20 of said cart platform 11. See, for example, FIGS. 2, 4-5 and 6B.

18. The trailer hitch attachable cart 10 of embodiment 17, wherein said ring-like loop member 16A has a width of less than about 1.0 inch (in.) (or any value less than 1.0 in., in increments of 0.1 in., e.g., 0.4 in., or any range of values less than 1.0 in., in increments of 0.1 in., e.g., 0.3 in. to 0.8 in.), and said tubular loop member 16B has a tubular loop member length $L_{tm}$ of from about 1.0 in. to about 24.0 in. (or any value between 1.0 in. and 24.0 in., in increments of 0.1 in., e.g., 3.5 in., or any range of values between 1.0 in. and 24.0 in., in increments of 0.1 in., e.g., 1.2 in. to 5.8 in.). See, FIG. 2.

19. The trailer hitch attachable cart 10 of embodiment 17 or 18, wherein said ring-like loop member 16A has a width of from about 0.2 in. to about 0.6 in., and said tubular loop member 16B has a tubular loop member length $L_{tm}$ of from about 3.0 in. to about 12.0 in.

20. The trailer hitch attachable cart 10 of any one of embodiments 17 to 19, wherein a handle engaging end 21 of said tubular loop member 16B extends beyond an outer edge 20 of said cart platform 11.

21. The trailer hitch attachable cart 10 of any one of embodiments 17 to 20, wherein said tubular loop member 16B comprising one or more third holes 161 extending through a side wall 162 thereof. See, for example, FIG. 5.

22. The trailer hitch attachable cart 10 of embodiment 21, wherein at least one of said one or more third holes 161 is within said handle engaging end 21 of said tubular loop member 16B.

23. The trailer hitch attachable cart 10 of any one of embodiments 2 and 5 to 16, wherein said one or more cart handle seating members 16 comprises at least one clip member 16C, said at least one clip member 16C enabling one-step positioning of said rotatable cart handle 15 within said clip member 16C.

24. The trailer hitch attachable cart 10 of embodiment 23, wherein said at least one clip member 16C comprises a single clip member 16C.

25. The trailer hitch attachable cart 10 of embodiment 23 or 24, wherein said at least one clip member 16C is positioned along an outer surface 142/144 of said first tubular member 14.

26. The trailer hitch attachable cart 10 of any one of embodiments 23 to 25, wherein said at least one clip member 16C is positioned along an outer lower surface 144 of said first tubular member 14.

27. The trailer hitch attachable cart 10 of any one of embodiments 23 to 26, wherein each of said at least one clip member 16C comprises two clip member appendages 161 and 162, opposite ends 163 and 164 of said two clip member appendages 161 and 162, and a gap 165 between said opposite ends 163 and 164, said opposite ends 163 and 164 having a resiliency that enables a user to push said portion of said rotatable cart handle 15 therebetween via an applied force. See, for example, FIGS. 12 and 14A-14B.

28. The trailer hitch attachable cart 10 of any one of embodiments 1, 2 and 5 to 27, wherein said cart handle 15 has at least one handle hole 151 therein or therethrough. See, for example, FIG. 5.

29. The trailer hitch attachable cart 10 of claim 28, wherein said cart handle 15 is detachable from said trailer hitch attachable cart 10.

30. The trailer hitch attachable cart 10 of embodiment 28 or 29, wherein said at least one handle hole 151 comprises (i) a first handle hole 151A within a cart engaging end 153 of said rotatable cart handle 15, and (ii) a second handle hole 151B proximate a grasping end 154 of said rotatable cart handle 15, said first handle hole 151A being engaged when said cart handle 15 is in a use position, and said second handle hole 151B being engaged when said cart handle 15 is in a storage position.

31. The trailer hitch attachable cart 10 of any one of embodiments 1 and 5 to 30, further comprising a second pin member 23, said second pin member 23 being sized and shaped so as to engage with said cart handle 15 and said cart platform 11 so as to attach said cart handle 15 to said cart platform 11 in a use position. See, for example, FIG. 8.

32. The trailer hitch attachable cart 10 of embodiment 31, wherein said second pin member 23 engages with (i) said cart handle 15 and (ii) said handle engaging end 21 of said tubular loop member 16B. See, for example, FIG. 8.

33. The trailer hitch attachable cart 10 of claim 28, wherein said cart handle 15 is permanently attached to said trailer hitch attachable cart 10. As used herein, the phrase "permanently attached" describes a handle 15 that is attached to said lower major surface 13 of said cart platform 10, and not meant to be removed unless replaced due to wear.

34. The trailer hitch attachable cart 10 of claim 28 or 33, wherein said cart handle 15 comprises a handle grasping end 154 and a cart engaging end 153 opposite said handle grasping end 154.

35. The trailer hitch attachable cart 10 of claim 34, wherein said handle grasping end 154 is positioned beneath said lower major surface 13 of said cart platform 11 and said first tubular member 14 when in said storage position.

Figure 16:
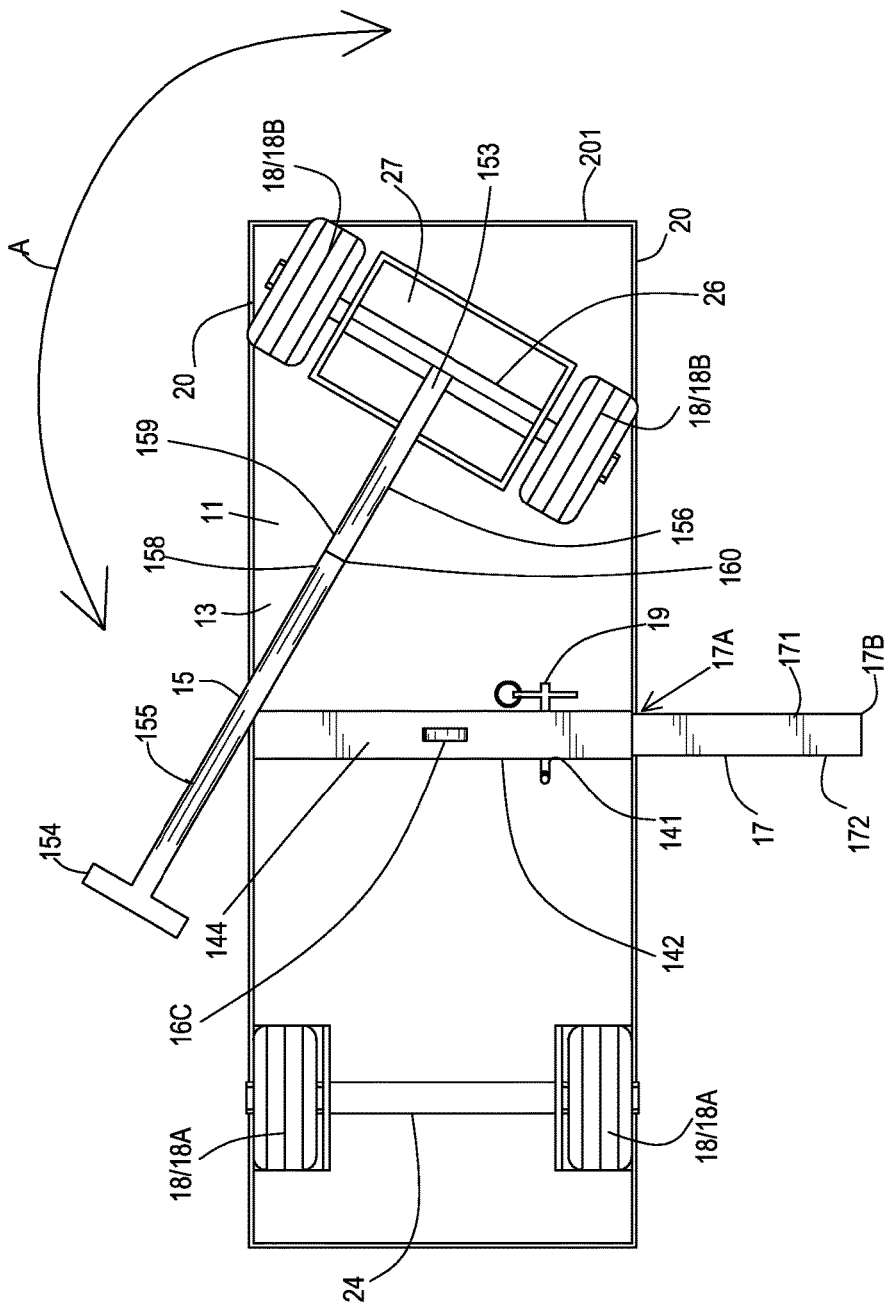
FIG. 16 is a bottom view of the exemplary trailer hitch attachable cart of FIG. 9 showing (i) the rotatable cart handle in a use position, and (ii) an extendable tubular member sized to fit within a trailer hitch receiver.
Figure 17:
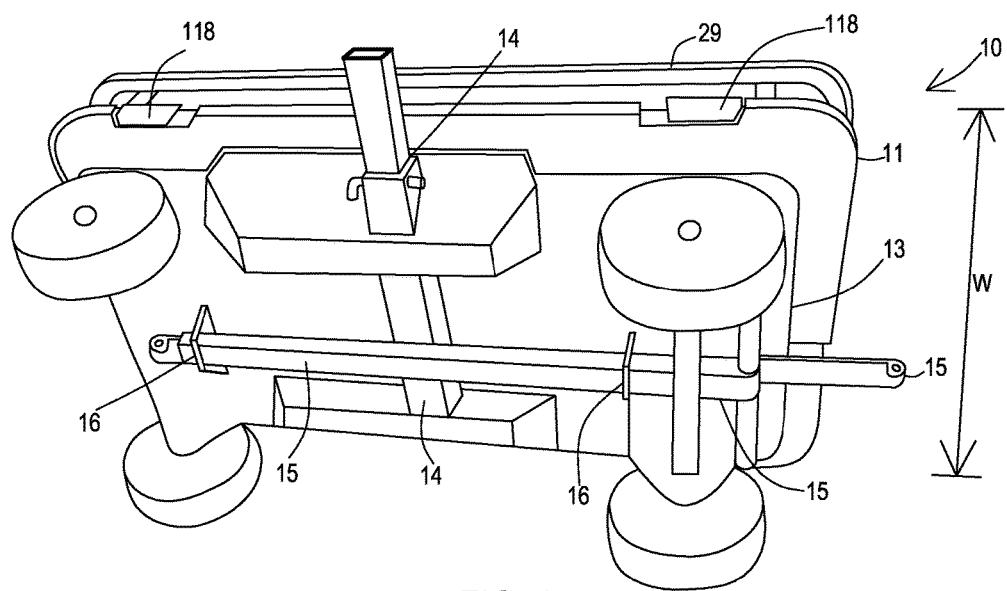
FIG. 17 is a bottom side view of another exemplary trailer hitch attachable cart of the present invention with a detachable handle in a stored position.
Figure 18:
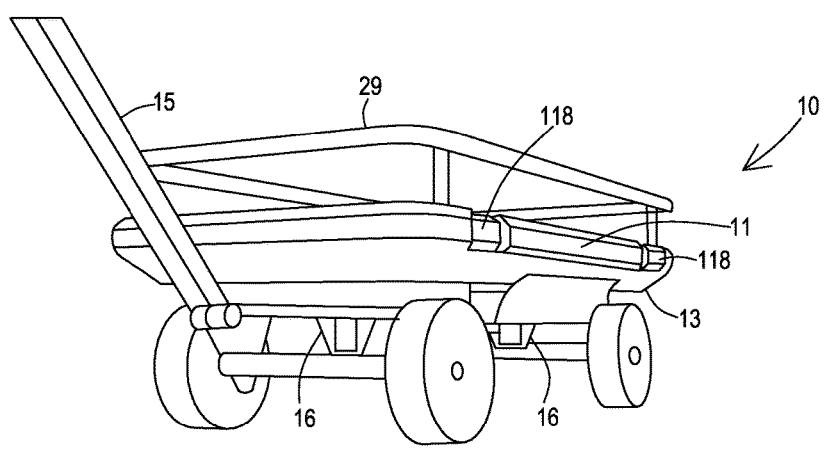
FIG. 18 is a perspective view of the exemplary trailer hitch attachable cart shown in FIG. 17 with the detachable handle in a use (i.e., attached) position.

36. The trailer hitch attachable cart 10 of claim 34 or 35, wherein said handle grasping end 154 rotates from (i) said storage position beneath said lower major surface 13 of said cart platform 11 and said first tubular member 14 to (ii) a use position, wherein said handle grasping end 154 is positioned outside an outer edge 20 of said cart platform 11. See, for example, rotation direction A shown in FIG. 16. In desired embodiments, cart handle 15 rotates within a plane from one side of clip member 16C to the other, or a rotation range of up to about 350° (or any value less than about 350°, in increments of 0.1°, e.g., 345.2°, or any range of values less than about 350°, in increments of 0.1°, e.g., 180° to 270°).

37. The trailer hitch attachable cart 10 of any one of claims 34 to 36, wherein said cart connecting end 153 of said cart handle 15 is connected to said cart 10 proximate an outer front edge 201 of said cart 10.

38. The trailer hitch attachable cart 10 of any one of claims 34 to 37, wherein said cart connecting end 153 of said cart handle 15 is connected to said cart 10 along an outer front edge 201 of said cart 10.

39. The trailer hitch attachable cart 10 of any one of claims 34 to 38, wherein said cart connecting end 153 of said cart handle 15 is connected to said cart 10 via a handle pivoting member 27.

40. The trailer hitch attachable cart 10 of any one of claims 34 to 39, wherein said cart connecting end 153 of said cart handle 15 is connected to said cart 10 via a handle pivoting member 27, said handle pivoting member 27 being pivotably mounted to said cart platform 11 so as to pivot along with one or more front wheels 18 of said cart 10.

Figure 13:
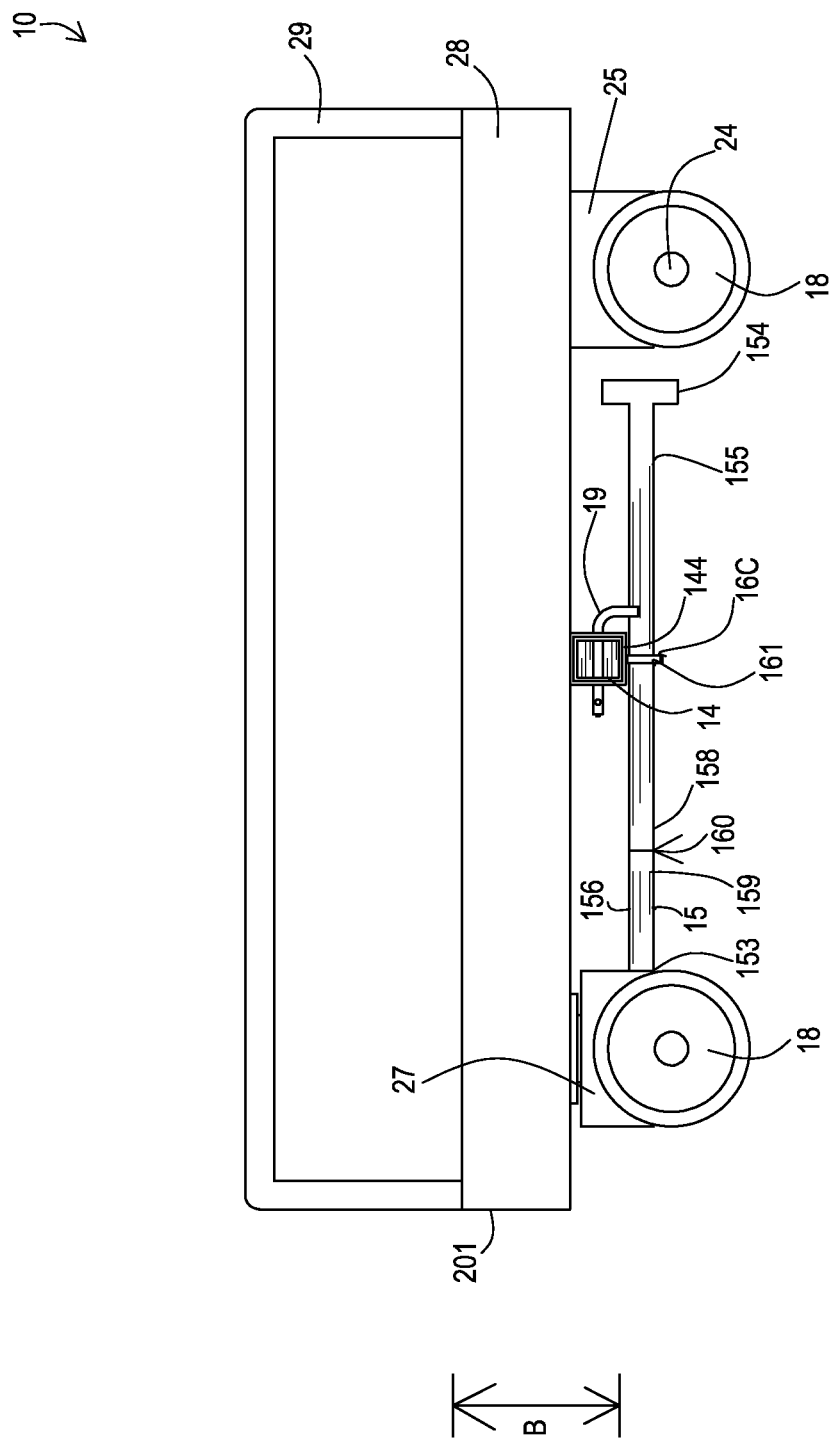
FIG. 13 is a frontal view of the exemplary trailer hitch attachable cart of FIG. 9.

41. The trailer hitch attachable cart 10 of any one of claims 1, 2 and 5 to 40, wherein said cart handle 15 comprises two handle components 155/156 joined to one another via a handle joint 157, said two handle components 155/156 comprising (i) a first handle component 155 comprising a handle grasping end 154 and a first handle component joining end 158, and (ii) a second handle component 156 comprising a cart connecting end 153 and a second handle component joining end 159, said second handle component joining end 159 being joined to said first handle component joining end 158. In some embodiments, a joint 160 is positioned between and joins first handle component joining end 158 to second handle component joining end 159. See, for example, FIG. 16. In some embodiments, joint 160 enables first handle component 155 to move up and down relative to second handle component 156 along a path B as shown in FIG. 13.

42. The trailer hitch attachable cart 10 of any one of embodiments 3, 4 and 6 to 41, wherein said three or more wheels 18 comprises four wheels 18. As discussed above, in one desired embodiment, each wheel has a substantially identical size and shape, and has an overall diameter of about 8.5 in. and a wheel width of about 5.0 in.

43. The trailer hitch attachable cart 10 of any one of embodiments 3, 4 and 6 to 42, wherein said three or more wheels 18 comprises: a set of two rear wheels 18A, and at least one front wheel 18B, said at least one front wheel 18B being pivotably connected to said lower major surface 13 of said cart platform 11. See, for example, FIG. 8.

44. The trailer hitch attachable cart 10 of embodiment 43, wherein said cart 10 further comprises a rear wheel axle 24 connecting said two rear wheels 18A to one another.

45. The trailer hitch attachable cart 10 of embodiment 43 or 44, wherein said cart 10 further comprises a rear wheel connecting member 25, said rear wheel connecting member 25 connecting said two rear wheels 18A to said lower major surface 13 of said cart platform 11.

46. The trailer hitch attachable cart 10 of any one of embodiments 43 to 45, wherein said cart 10 further comprises a front wheel axle 26 connecting two front wheels 18B to one another.

47. The trailer hitch attachable cart 10 of any one of embodiments 43 to 46, wherein said cart 10 further comprises a pivoting member 27 attached to said lower major surface 13 of said cart platform 11, said pivoting member 27 (i) connecting said at least one front wheel 18B to said lower major surface 13 of said cart platform 11, and (ii) enabling said at least one front wheel 18B to pivot relative to said cart platform 11.

48. The trailer hitch attachable cart 10 of embodiment 47, wherein said second pin member 19 engages with (i) said cart handle 15 and (ii) said handle engaging end 21 of said tubular loop member 16B, said tubular loop member 16B being attached to said pivoting member 27.

49. The trailer hitch attachable cart 10 of any one of embodiments 1 to 48, further comprising a side wall 28 extending along at least a portion of an outer edge 20 of said cart platform 11.

50. The trailer hitch attachable cart 10 of any one of embodiments 1 to 49, further comprising a side wall 28 extending along all of an outer edge 20 of said cart platform 11.

51. The trailer hitch attachable cart 10 of any one of embodiments 1 to 50, further comprising one or more railings 29 extending upward from an outer edge 20 of said cart platform 11.

52. The trailer hitch attachable cart 10 of any one of embodiments 1 to 50, further comprising one or more railings 29 extending upward from an outer edge 20 of said cart platform 11, at least a portion of said one or more railings 29 being movable from an upper railing position to a lower railing position. See, for example, exemplary railings 29 shown in an upper railing position in FIG. 20, and in a lower railing position in FIG. 21. Desirably, exemplary railings 29 lock within both the upper railing position and the lower railing position.

53. The trailer hitch attachable cart 10 of any one of embodiments 1 to 52, wherein said cart platform 11 comprises a plurality of apertures (not shown) extending through said cart platform 11 from said upper major surface 12 to said lower major surface 13. For example, car platform 11 may have a metal mesh configuration so as to allow rain water to pass through cart platform 11.

Figure 20:
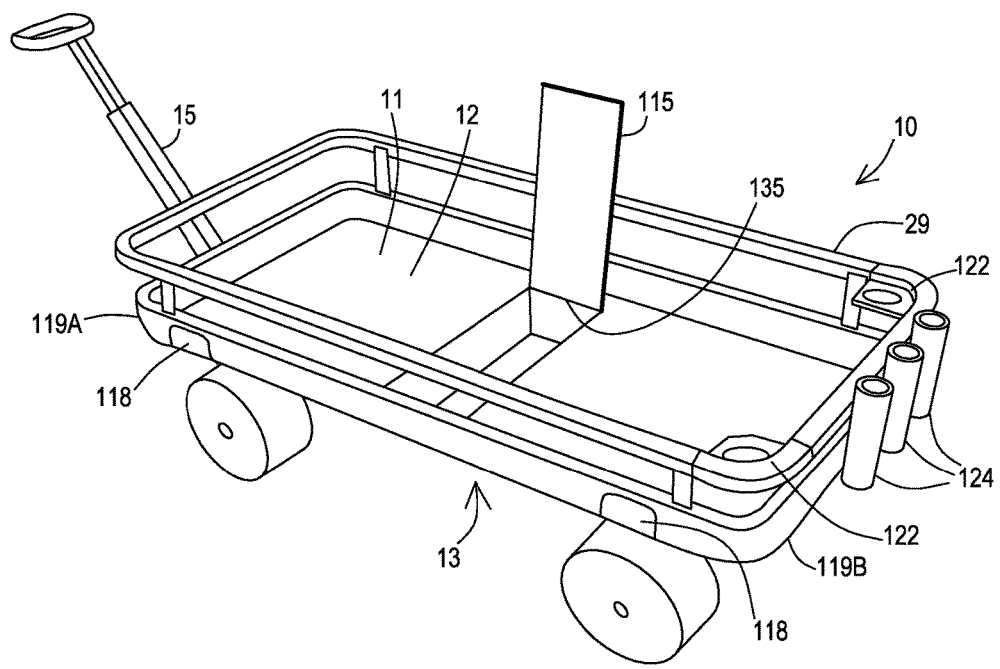
FIG. 20 is a top perspective view of another exemplary trailer hitch attachable cart of the present invention with an optional storage compartment/access panel within a bed of the cart.
Figure 21:
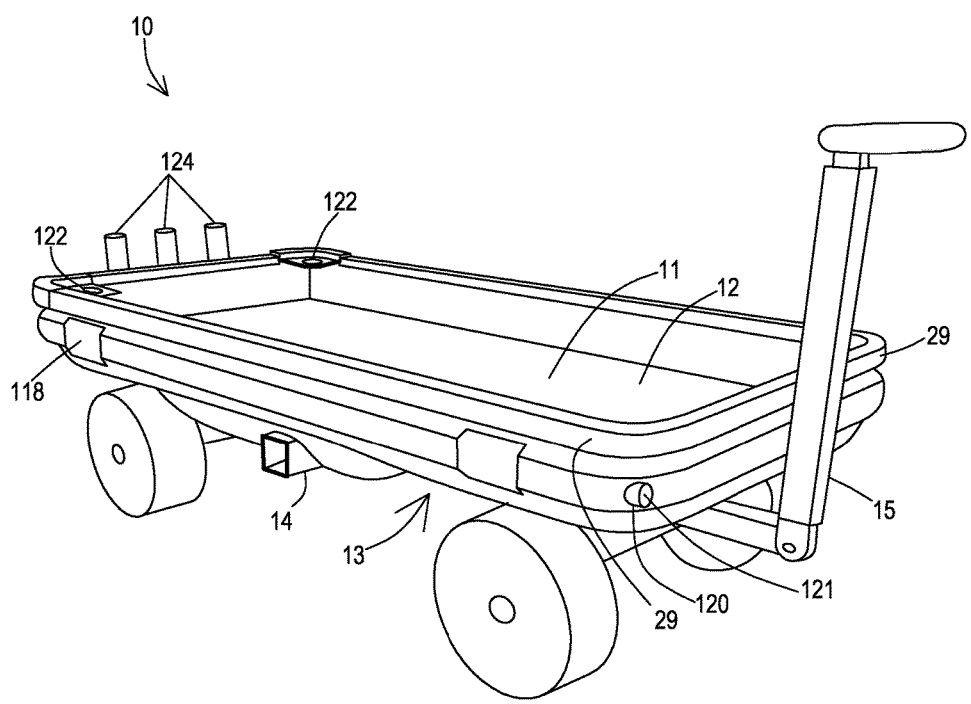
FIG. 21 is a side perspective view of the exemplary trailer hitch attachable cart shown in FIG. 20 with a number of optional accessories for the cart.

54. The trailer hitch attachable cart 10 of any one of embodiments 1 to 53, wherein said cart platform 11 further comprises one or more access panels 115 within said upper major surface 12. See, for example, exemplary access panel 115 shown in FIG. 20. As shown in FIG. 20, exemplary access panel 115 is attached to cart 10 via hinge 135.

55. The trailer hitch attachable cart 10 of embodiment 54, wherein said one or more access panels 115 is positioned over said first tubular member 14.

56. The trailer hitch attachable cart 10 of embodiment 54 or 55, wherein said one or more access panels 115 is sized so as to enable access to one or more pins 19 attached to said first tubular member 14.

57. The trailer hitch attachable cart 10 of any one of embodiments 1 to 56, wherein said cart platform 11 further comprises one or more storage volumes 119 positioned between said upper major surface 12 and said lower major surface 13.

58. The trailer hitch attachable cart 10 of embodiment 57, wherein said one or more storage volumes 119 is accessible by disengaging one or more storage locks 118 positioned along said cart 10. See, for example, exemplary storage locks 118 shown in FIGS. 17-18 and 20-21. In this exemplary embodiment, trailer hitch attachable cart 10 comprises two storage volumes 119A and 119B positioned on opposite sides of exemplary access panel 115. See, FIG. 20.

59. The trailer hitch attachable cart 10 of any one of embodiments 1 to 58, wherein said cart 10 further comprises one or more surface holes 120 therein, said one or more surface holes 120 being sized to house one or more removable objects 121 therein. See, for example, exemplary surface holes 120 shown in FIG. 21.

60. The trailer hitch attachable cart 10 of embodiment 59, further comprises one or more removable objects 121 positioned within said one or more surface holes 120.

61. The trailer hitch attachable cart 10 of embodiment 59 or 60, wherein said one or more removable objects 121 comprise a flashlight 121. See, for example, exemplary flashlight 121 shown in FIG. 21.

62. The trailer hitch attachable cart 10 of any one of embodiments 1 to 61, wherein said cart 10 further comprises one or more cup holders 122. See, for example, exemplary cup holders 122 shown in FIGS. 20-21.

63. The trailer hitch attachable cart 10 of any one of embodiments 1 to 62, wherein said cart 10 further comprises one or more fishing rod holders 124. See, for example, exemplary fishing rod holders 124 shown in FIGS. 20-21.

64. The trailer hitch attachable cart 10 of any one of embodiments 1 to 63, wherein said cart 10 further comprises a cargo net 130 attachable to said cart platform 11. See, for example, exemplary cargo net 130 shown in FIG. 19.

Figure 19:
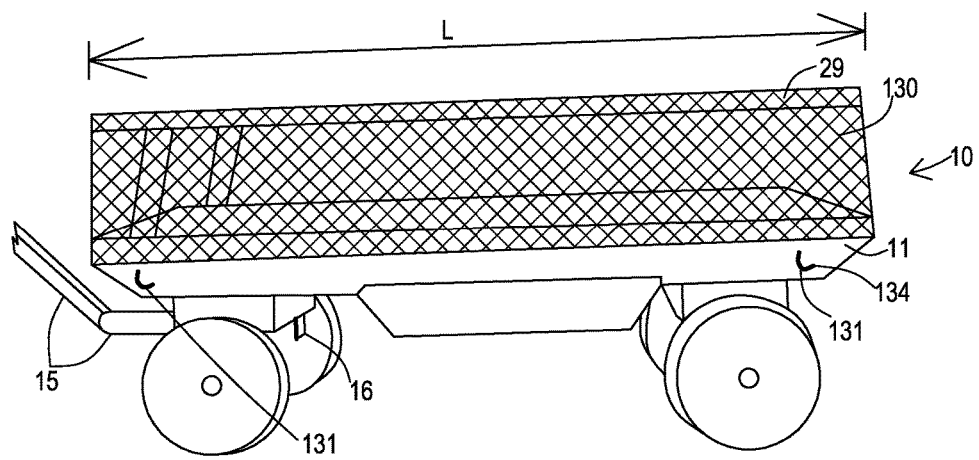
FIG. 19 is a side view of the exemplary trailer hitch attachable cart shown in FIG. 18 with an attachable screen member attached to the railing and chassis of the cart.

65. The trailer hitch attachable cart 10 of embodiment 64, wherein said cargo net 130 is attachable to said cart platform 11 via (i) one or more hooks 131 attached to said cargo net 130, and (ii) one or more hook holes 134 within said cart 10. See, for example, exemplary hooks 131 and hook holes 134 shown in FIG. 19. In some embodiments, trailer hitch attachable cart 10 comprises four separate hooks 131 and four separate hook holes 134 as shown in FIG. 19.

66. The trailer hitch attachable cart 10 of any one of embodiments 1, 2 and 5 to 65, wherein said cart handle 15 comprises a telescoping cart handle 15. See, for example, exemplary telescoping cart handle 15 shown in FIGS. 20-21.

67. The trailer hitch attachable cart 10 of any one of embodiments 1, 2 and 5 to 66, wherein said cart handle 15 is attach to said cart platform 11 in a use position. See, for example, FIGS. 8 and 18-21.

68. The trailer hitch attachable cart 10 of any one of embodiments 1, 2 and 5 to 66, wherein said cart handle 15 is attach to said cart platform 11 in said storage position. See, for example, FIGS. 1-7 and 17.

69. The trailer hitch attachable cart 10 of any one of embodiments 1 to 68, wherein said cart platform 11 and said first tubular member 14 (or any other cart component) each independently comprises a metal material, a polymeric material, a composite material, a cellulosic material, or any combination thereof.

70. The trailer hitch attachable cart 10 of any one of embodiments 1 to 69, wherein said cart platform 11 and said first tubular member 14 each independently comprises a metal material.

71. The trailer hitch attachable cart 10 of any one of embodiments 1 to 70, wherein said cart platform 11 and said first tubular member 14 each independently comprises a metal material selected from aluminum, steel, or a combination thereof.

72. The trailer hitch attachable cart 10 of any one of embodiments 1 to 69, wherein said cart platform 11 comprises a polymeric material, a composite material, a cellulosic material, or any combination thereof, and said first tubular member 14 comprises a metal material.

73. The trailer hitch attachable cart 10 of any one of embodiments 1 to 69 and 72, wherein said cart platform 11 comprises a polymeric material, and said first tubular member 14 comprises a metal material.

74. The trailer hitch attachable cart 10 of any one of embodiments 1 to 73, wherein said cart platform 11, said first tubular member 14, or both, is at least partially coated with an anti-slip material (not shown).

75. The trailer hitch attachable cart 10 of embodiment 74, wherein said anti-slip material comprises a rubber-like material.

76. The trailer hitch attachable cart 10 of any one of embodiments 1 to 75 in combination with a trailer hitch receiving member of the vehicle (not shown).

77. The trailer hitch attachable cart 10 of any one of embodiments 1 to 76 attached to a trailer hitch receiving member of the vehicle (not shown).

Methods of Making Trailer Hitch Attachable Carts Embodiments:

78. A method of making the trailer hitch attachable cart 10 of any one of embodiments 1 to 75, said method comprising: attaching one or more cart components to one another so as to form the trailer hitch attachable cart 10.

79. The method of embodiment 78, further comprising: forming one or more components used to make the trailer hitch attachable cart 10.

80. The method of embodiment 79, wherein said forming step comprises at least one of: extruding material to form at least one of the cart platform 11, the first tubular member 14, the cart handle 15, the one or more cart handle seating members 16 for supporting the cart handle 15 beneath the cart platform 11, and the second tubular member 17; cutting material to form at least one of the cart platform 11, the first tubular member 14, the cart handle 15, the one or more cart handle seating members 16 for supporting the cart handle 15 beneath the cart platform 11, and the second tubular member 17; machining material to form at least one of the cart platform 11, the first tubular member 14, the cart handle 15, the one or more cart handle seating members 16 for supporting the cart handle 15 beneath the cart platform 11, and the second tubular member 17; drilling one or more holes in at least one of the cart platform 11, the first tubular member 14, the cart handle 15, the one or more cart handle seating members 16 for supporting the cart handle 15 beneath the cart platform 11, and the second tubular member 17.

Methods of Using Trailer Hitch Attachable Carts Embodiments:

81. A method of using the trailer hitch attachable cart 10 of any one of embodiments 1 to 75, said method comprising: attaching the trailer hitch attachable cart 10 to a trailer hitch receiving member of a vehicle (not shown).

82. The method of embodiment 81, further comprising: securing one or more items (not shown) to the cart platform 11 of the cart 10.

83. The method of embodiment 81 or 82, further comprising: detaching the trailer hitch attachable cart 10 from the trailer hitch receiving member of the vehicle (not shown).

84. The method of any one of embodiments 81 to 83, further comprising: positioning the cart handle 15 underneath the cart platform 11 in a storage position via the one or more cart handle seating members 16.

85. The method of any one of embodiments 81 to 84, further comprising: disconnecting the cart handle 15 from the one or more cart handle seating members 16; and positioning the cart handle 15 in a use position. See, for example, FIGS. 8 and 16.

86. The method of any one of embodiments 81 to 85, further comprising: detaching the cart handle 15 from the trailer hitch attachable cart 10.

87. The method of any one of embodiments 81 to 86, further comprising: attaching the cart handle 15 to the trailer hitch attachable cart 10.

88. The method of any one of embodiments 81 to 87, further comprising: moving the trailer hitch attachable cart 10 from one location to another location by applying a pulling force on the cart handle 15.

89. The method of any one of embodiments 81 to 88, wherein the vehicle (not shown) comprises a car, a truck, an all-terrain vehicle, or a bus.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Preparation of Trailer Hitch Attachable Carts

Exemplary trailer hitch attachable carts as shown in FIGS. 1-21 were prepared.

It should be understood that although the above-described trailer hitch attachable carts and/or methods are described as "comprising" one or more components or steps, the above-described trailer hitch attachable carts and/or methods may "comprise," "consists of," or "consist essentially of" the above-described components, features or steps of the trailer hitch attachable carts and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a trailer hitch attachable cart and/or method that "comprises" a list of elements (e.g., components, features, or steps) is not necessarily limited to only those elements (or components or steps), but may include other elements (or components or steps) not expressly listed or inherent to the trailer hitch attachable cart and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a trailer hitch attachable cart and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described trailer hitch attachable carts and/or methods may comprise, consist essentially of, or consist of any of the herein-described components, features and steps, as shown in the figures with or without any feature(s) not shown in the figures. In other words, in some embodiments, the trailer hitch attachable carts and/or methods of the present invention do not have any additional features other than those shown in the figures, and such additional features, not shown in the figures, are specifically excluded from the trailer hitch attachable carts and/or methods. In other embodiments, the trailer hitch attachable carts and/or methods of the present invention do have one or more additional features that are not shown in the figures. For example, although not shown in the figures, the trailer hitch attachable carts of the present invention may further comprise one or more of the following additional features: a bottle opener positioned along an outer surface (e.g., along a surface of the fishing rod holder, along a surface of the platform such as a rear surface, etc.) of the cart; a knife and/or pliers holder cut into the fishing rod holder accessory; and grab handles molded into the plastic base tray/platform of the cart/wagon.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A trailer hitch attachable cart, said cart comprising:
   a cart platform, said cart platform having an upper major surface, a lower major surface opposite said upper major surface, a platform length, and a platform width;
   a first tubular member attached to said lower major surface, said first tubular member having a first size and a first cross-sectional shape;
   a second tubular member having a second size and a second cross-sectional shape so as to be snugly positioned within said first tubular member, said second tubular member having a first engagement end sized to be snugly positioned within said first tubular member, and a second engagement end, opposite said first engagement end, sized to be snugly positioned within a trailer hitch receiving member, said second tubular member being movable from (i) a second tubular member storage position in which said second tubular member is within said first tubular member so that said second engagement end is within an outer edge of said cart platform to (ii) a second tubular member use position wherein said second engagement end of second tubular member extends from and out of said first tubular member beyond the outer edge of said cart platform;
   four wheels (i) permanently attached to said lower major surface of said cart platform and (ii) extending below said first tubular member, said four wheels comprising two front wheels and two rear wheels;
   a cart handle that is attachable and detachable from said trailer hitch attachable cart; and a storage system for storing said cart handle when in a storage position, said storage system comprising one or more cart handle seating members attached to said lower major surface, each of said one or more cart handle seating members being sized to accept and support a portion of said cart handle therethrough, wherein (1) said one or more cart handle seating members comprises a tubular loop member (i) connected to said two front wheels via a pivoting member and (ii) having a handle engaging end that extends beyond an outer front edge of said cart platform, (2) said cart handle is movable between (i) the storage position in which said cart handle is positioned thru said tubular loop member, and (ii) a use position in which a cart connecting end of said cart handle is connected to said handle engaging end of said tubular loop member, and (3) said four wheels are positioned above and not in contact with a ground surface when said trailer hitch attachable cart is attached to a vehicle via said second tubular member.

2. The trailer hitch attachable cart claim 1, wherein said platform length is greater than said platform width, and said platform length is approximately equal to a width of a vehicle.

3. The trailer hitch attachable cart claim 1, wherein said first tubular member is positioned at an approximate midpoint of said platform length, and extends in a direction aligned with said platform width; and said first tubular member comprising two or more first holes extending through a side wall thereof, each of said first holes being sized and shaped so as to receive a first pin member therethrough.

4. The trailer hitch attachable cart of claim 3, wherein said second tubular member comprising two or more second holes extending through a side wall thereof, each of said second holes being sized and shaped so as to receive the first pin member therethrough.

5. The trailer hitch attachable cart of claim 4, further comprising the first pin member, said first pin member being sized to extend within (i) any one of said two or more first holes, and (ii) any one of said two or more second holes, said first pin member being insertable within (1) a first pair of a first hole of said two or more first holes and a second hole of said two or more second holes so as to lock said second tubular member in said second tubular member storage position within said first tubular member, and (2) a second pair of a first hole of said two or more first holes and a second hole of said two or more second holes so as to lock said second tubular member in said second tubular member use position wherein a portion of said second tubular member extends from and out of said first tubular member.

6. The trailer hitch attachable cart of claim 1, wherein said first engagement end of said second tubular member is in a first position within said first tubular member when in said second tubular member storage position, and in a second position within said first tubular member when in said second tubular member use position, and said second tubular member is movable linearly between said first position and said second position while remaining within said first tubular member.

7. The trailer hitch attachable cart of claim 1, wherein said one or more cart handle seating members comprise: a single tubular member, said single tubular member comprising said tubular loop member.

8. The trailer hitch attachable cart of claim 1, wherein said one or more cart handle seating members further comprise a cart handle seating member extending downward from said first tubular member.

9. The trailer hitch attachable cart of claim 1, wherein said tubular loop member has a tubular loop member length of from about 3.0 inches (in) to about 12.0 in.

10. A trailer hitch attachable cart, said cart comprising:
a cart platform, said cart platform having an upper major surface, a lower major surface opposite said upper major surface, a platform length, and a platform width;
a first tubular member attached to said lower major surface, said first tubular member having a first size and a first cross-sectional shape so as to enable attachment of said cart to a trailer hitch receiving member;
a second tubular member having a second size and a second cross-sectional shape so as to be snugly positioned within said first tubular member, said second tubular member having a first engagement end sized to be snugly positioned within said first tubular member, and a second engagement end, opposite said first engagement end, sized to be snugly positioned within said first tubular member or within a trailer hitch receiving member, said second tubular member being movable in a linear fashion from a second tubular member storage position in which said second engagement end is within said first tubular member to a second tubular member use position wherein a portion of second tubular member and said second engagement end extends from and out of said first tubular member;
three or more wheels (i) permanently attached to said lower major surface of said cart platform and (ii) extending below said first tubular member;
a cart handle that is attachable and detachable from said trailer hitch attachable cart; and
a storage system for storing said cart handle when in a storage position, said storage system comprising one or more cart handle seating members attached to said lower major surface, each of said one or more cart handle seating members being sized to accept and support a portion of said cart handle therethrough,
wherein (1) said one or more cart handle seating members comprise a tubular loop member, said tubular loop member having a handle engaging end that extends beyond an outer edge of said cart platform, (2) said cart handle comprises a handle grasping end and a cart connecting end opposite said handle grasping end, said cart handle is movable from (i) a storage position in which said cart handle is positioned thru said tubular loop member, and (ii) a use position in which said cart connecting end of said cart handle is connected to said handle engaging end of said tubular loop member, and (3) said three or more wheels are positioned above and not in contact with a ground surface when said trailer hitch attachable cart is attached to a vehicle via said second tubular member, and
wherein said three or more wheels comprises: a set of two rear wheels, and at least one front wheel, and (i) said at least one front wheel and (ii) said cart handle, when attached to said trailer hitch attachable cart, each being pivotably connected to said lower major surface of said cart platform so as to move in concert with one another.

11. The trailer hitch attachable cart of claim 10, wherein at least a portion of said handle grasping end is positioned beneath said lower major surface of said cart platform and said first tubular member when in said storage position.

12. The trailer hitch attachable cart of claim 10, wherein said three or more wheels comprises four wheels.

13. The trailer hitch attachable cart of claim 10, wherein said at least one front wheel is pivotably connected to said lower major surface of said cart platform via a pivoting member, and said tubular loop member is connected to said pivoting member.

14. The trailer hitch attachable cart of claim 10, wherein said first engagement end of said second tubular member is in a first position within said first tubular member when in said second tubular member storage position, and in a second position within said first tubular member when in said second tubular member use position, and said second tubular member is movable between said first position and said second position while remaining within said first tubular member.

15. The trailer hitch attachable cart of claim 10, wherein said one or more cart handle seating members comprise: a single tubular member, said single tubular member comprising said tubular loop member.

16. A trailer hitch attachable cart, said cart comprising:
a cart platform, said cart platform having an upper major surface, a lower major surface opposite said upper major surface, a platform length, and a platform width;
a first tubular member attached to said lower major surface, said first tubular member having a first size and a first cross-sectional shape;
a second tubular member having a second size and a second cross-sectional shape so as to be snugly positionable within said first tubular member, said second tubular member having a first engagement end sized to be snugly positioned within said first tubular member, and a second engagement end, opposite said first engagement end, sized to be snugly positioned (i) within said first tubular member when in a second tubular member storage position and (ii) within a trailer hitch receiving member when extending from and out of said first tubular member in a second tubular member use position;
three or more wheels (i) permanently attached to said lower major surface of said cart platform and (ii) extending below said first tubular member;
a cart handle comprising a handle grasping end and a cart connecting end opposite said handle grasping end; and
a storage system for storing said cart handle when in a storage position beneath said lower major surface of said cart platform, said storage system comprising one or more cart handle seating members attached to said lower major surface, each of said one or more cart handle seating members being sized to accept and support a portion of said cart handle therethrough,
wherein said three or more wheels are positioned above and not in contact with a ground surface when said trailer hitch attachable cart is attached to a vehicle via said second tubular member, and
wherein said three or more wheels comprises: a set of two rear wheels, and at least one front wheel, and (i) said at least one front wheel and (ii) said cart handle, when attached to said trailer hitch attachable cart, each being pivotably connected to said lower major surface of said cart platform so as to move in concert with one another.

17. The trailer hitch attachable cart of claim 16, wherein said handle grasping end rotates from (i) said storage position beneath said lower major surface of said cart platform and said first tubular member to (ii) a use position, wherein said handle grasping end is positioned outside an outer edge of said cart platform.

18. The trailer hitch attachable cart of claim 16, wherein said one or more cart handle seating members comprises a tubular loop member having a handle engaging end that extends beyond an outer edge of said cart platform, and said cart handle is movable between (i) the storage position in which said cart handle is positioned thru said tubular loop member, and (ii) a use position in which said cart connecting end of said cart handle is connected to said handle engaging end of said tubular loop member.

19. The trailer hitch attachable cart of claim 16, further comprising (1) one or more railings extending upward from an outer edge of said cart platform, and (2) (*i*) one or more cup holders, (ii) one or more fishing rod holders, or (iii) both (i) and (ii).

20. The trailer hitch attachable cart of claim 16, wherein said three or more wheels comprises four wheels.

\* \* \* \* \*